United States Patent [19]
Toda

[11] 3,971,066
[45] July 20, 1976

[54] SPECIAL EFFECT GENERATION SYSTEM IN AN IMAGE PICKUP SYSTEM
[75] Inventor: Kikuo Toda, Tokyo, Japan
[73] Assignee: Nippon Educational Television Company, Ltd., Tokyo, Japan
[22] Filed: Feb. 11, 1974
[21] Appl. No.: 441,567

[30] Foreign Application Priority Data
Mar. 1, 1973  Japan............................... 48-24567
Mar. 1, 1973  Japan............................... 48-24568
June 27, 1973 Japan............................... 48-72620
June 27, 1973 Japan............................... 48-72621

[52] U.S. Cl. ................................. 358/55; 350/51
[51] Int. Cl.² ................. H04N 9/04; G02B 17/00
[58] Field of Search ............. 358/22, 50, 55, 52; 350/49, 52, 53; 352/85; 178/DIG. 1, DIG. 27, DIG. 29, DIG. 6, 7.92, 6

[56]                References Cited
            UNITED STATES PATENTS
3,459,465   8/1969   Rosin et al. ........................... 350/49
3,511,571   5/1970   Ogle............................... 178/DIG. 1
3,515,460   6/1970   Baluteau et al. ...................... 358/55
3,603,726   9/1971   Garber et al. ...................... 178/7.92
3,718,751   2/1973   Landre et al. ......................... 358/50
3,739,080   6/1973   Bachmann ........................... 358/55

Primary Examiner—Robert L. Griffin
Assistant Examiner—R. John Godfrey
Attorney, Agent, or Firm—Cushman, Darby & Cushman

[57]                 ABSTRACT

A special effect generation system in an image pickup system e.g. for television and more particularly to a special effect generation system in an image pickup system wherein there is provided, between a taking lens forming a part of the image pickup system and an image receiving medium, an optical device for reflecting light beam passing through the taking lens and the image receiving medium, having a portion which is displaced whereby the incident light beam to the image receiving medium changes with the displacement to generate a special effect.

4 Claims, 31 Drawing Figures

LATERAL INVERSION DIRECTION OF THE IMAGE (a)
(b)
(c)
(d)
(e)

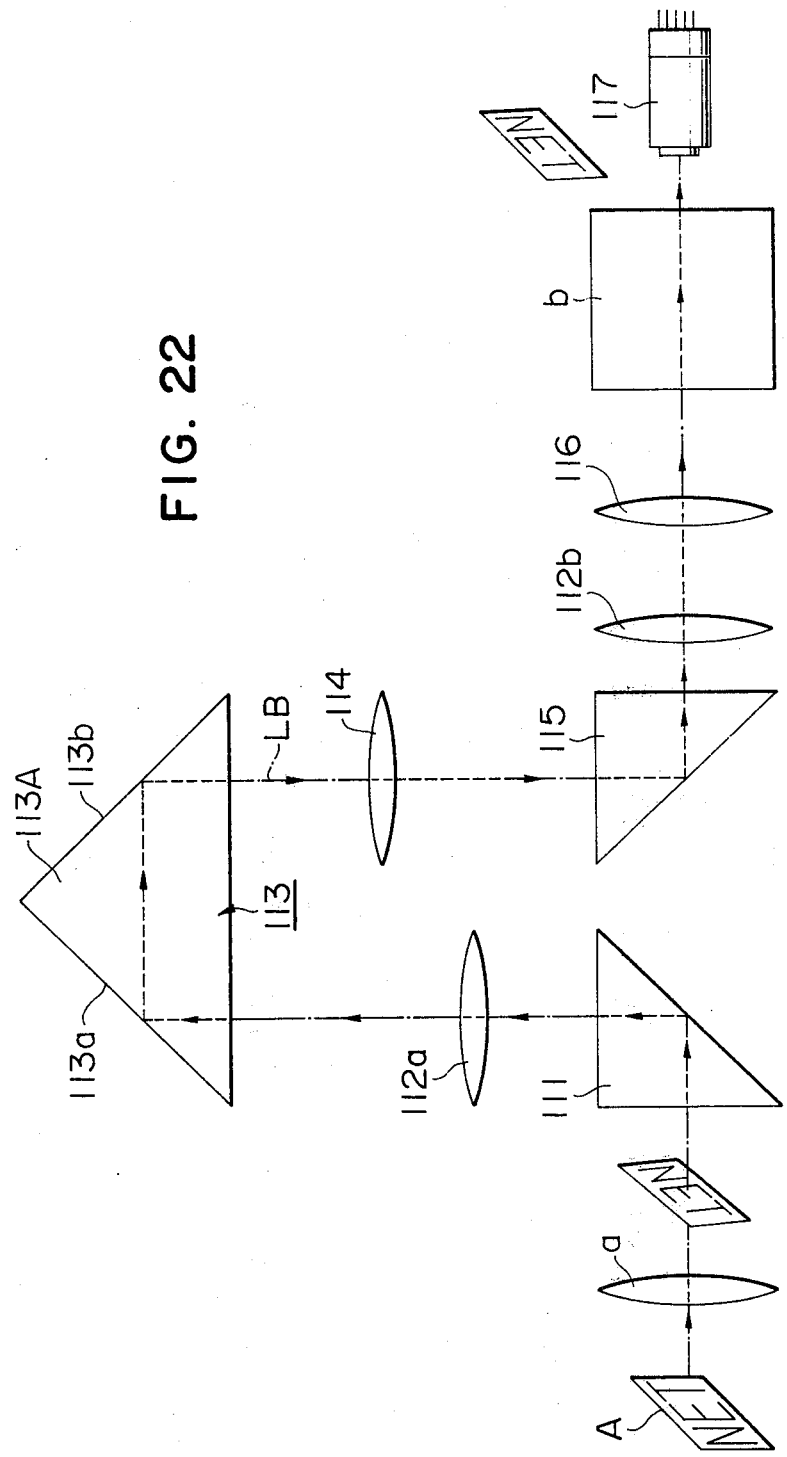

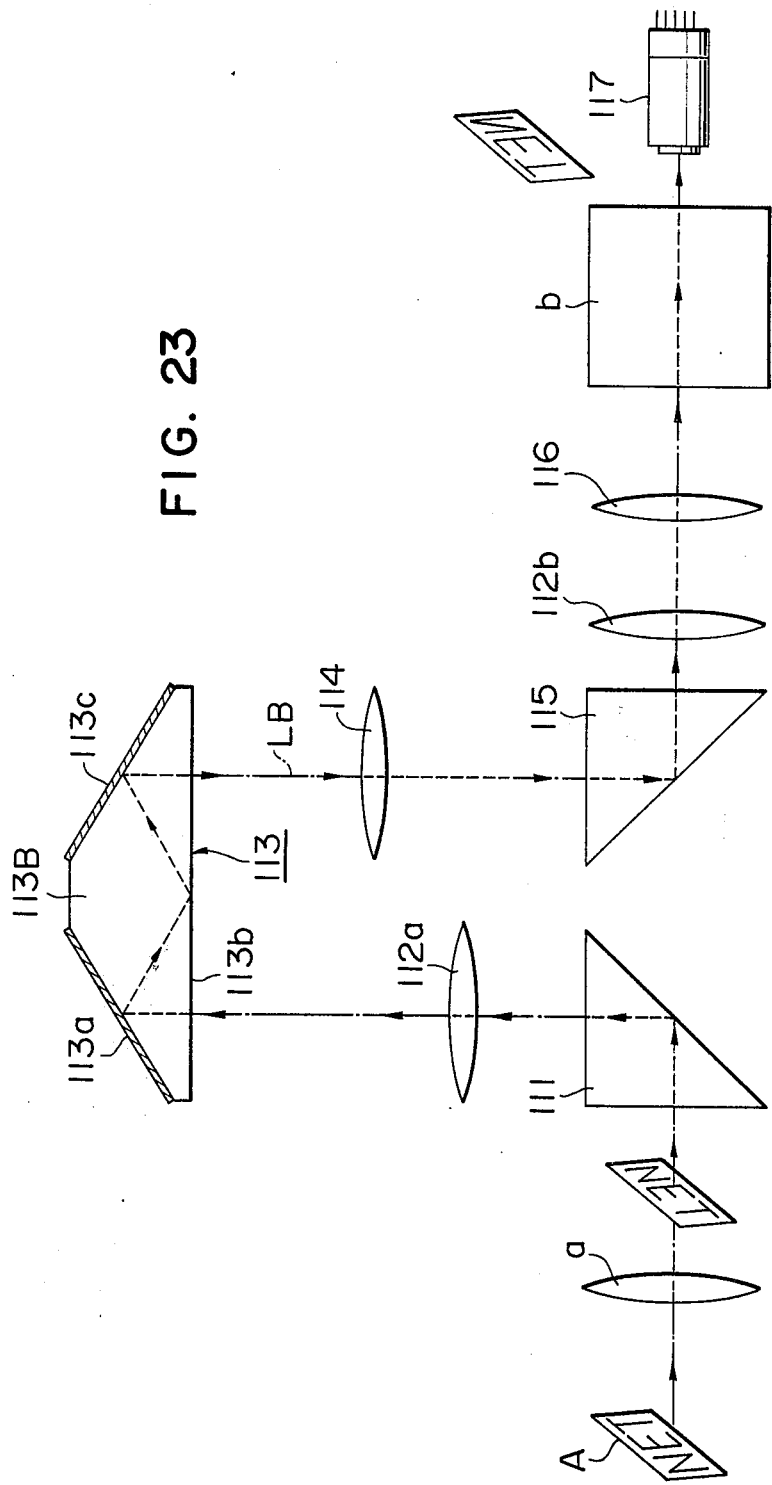

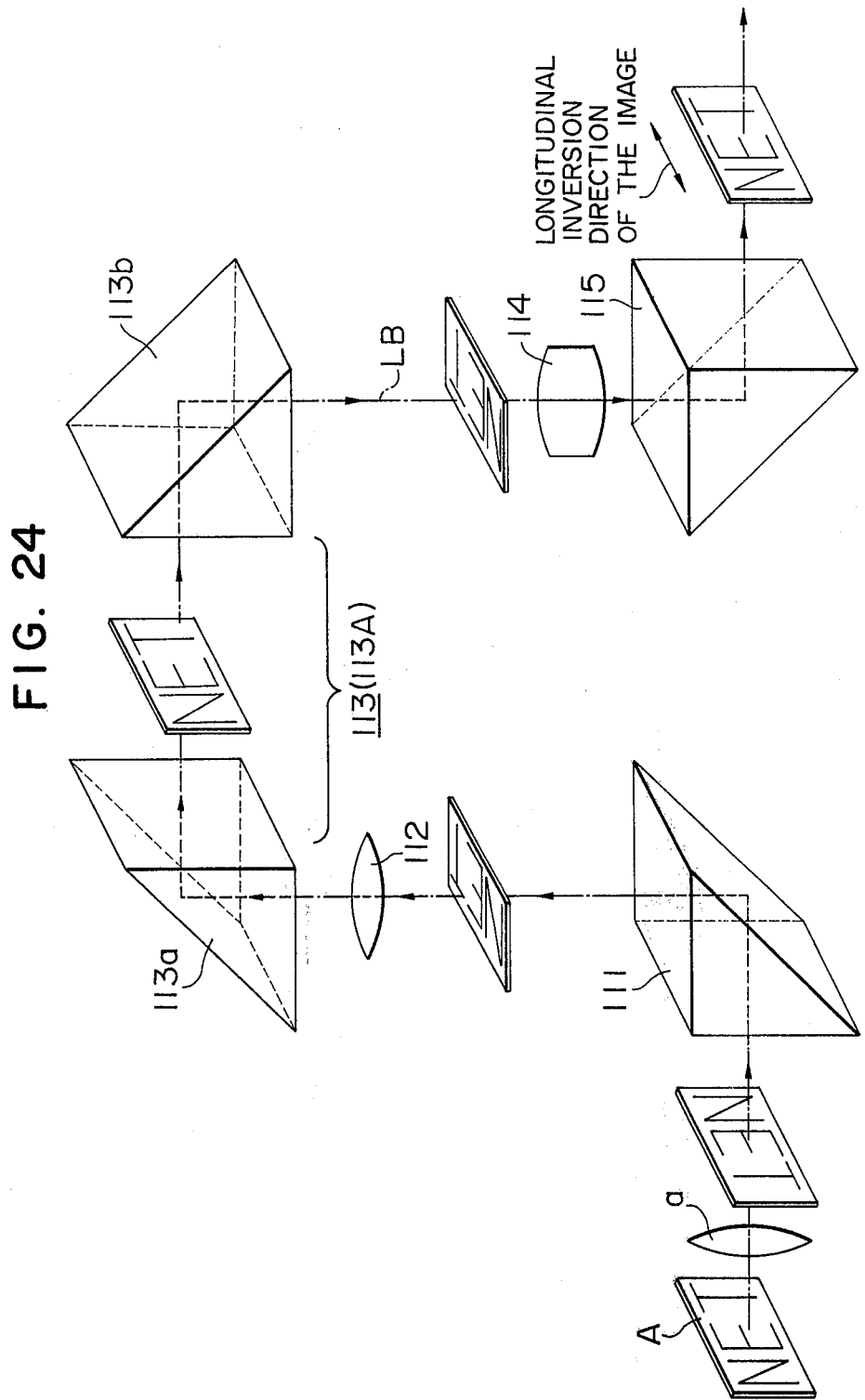

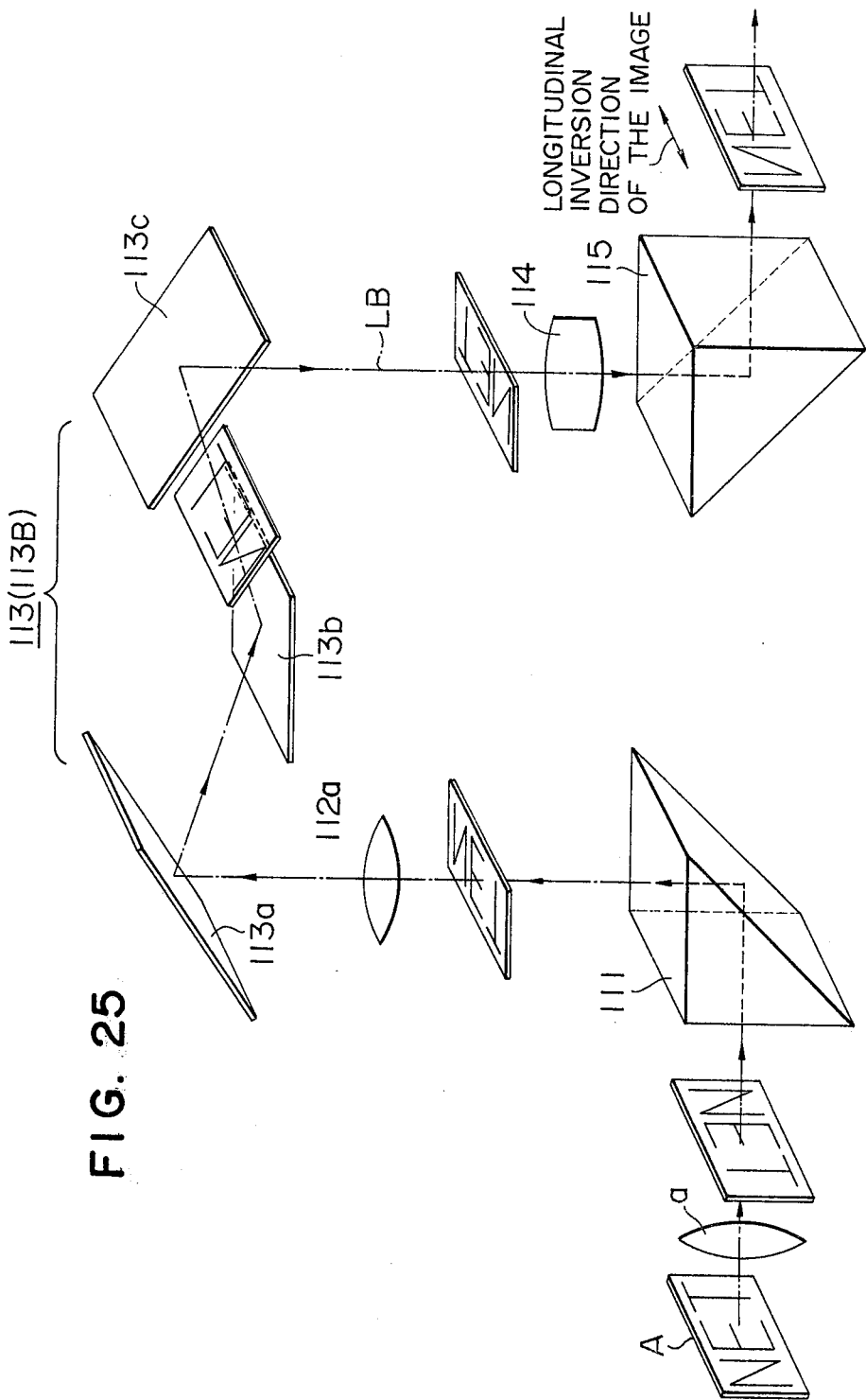

SPECIAL EFFECT GENERATION SYSTEM IN AN IMAGE PICKUP SYSTEM

BACKGROUND OF THE INVENTION

1. Field of the Invention

The present invention relates to a special effect generation system wherein there is provided, between a taking lens in an image pickup system and an image receiving medium, a compact optical device for reflecting a light beam having an optical member which forms a part of the optical device and is displaced to provide a scene with an interesting effect.

2. Description of the Prior Art

There has been a great demand in preparing television programming to provide a so-called special effect in an image pickup system which, for example, includes continuously rotating an image or inventing the direction of the image (either laterally or longitudinally).

To rotate image in preparing the programming for a monochromatic system, as shown in FIGS. 1 and 2, an inversion prism 4 can be attached in front of a taking lens 3 and an image pickup tube 2 which together form a camera 1 so that the image is rotated two revolutions during each revolution of the prism. Thus, as shown in FIG. 1, a special effect is generated by rotating an original image at increments of 45° from position (a) to position (i).

In this case, however, since one inversion prism is used and hence the number of reflections of the light beam is odd, the generated image is inverted laterally. In order to correct it to a normal image it is necessary to modify an electric circuit in the camera device.

In recent years, a color system camera has been extensively used and, as shown in FIG. 3, such a camera 1 comprises a three-color split prism 5 and three image pickup tubes, i.e. a red image pickup tube 6a, a green image pickup tube 6b and a blue image pickup tube 6c. Furthermore a zooming lens having a large aperture has been commonly used as a taking lens. Accordingly it is not practical from the viewpoint of handling to mount the inversion prism in front of the taking lens. That is, a prism compatible with a large aperture zooming lens would be a huge one and hence not only the manufacture of the prism is difficult but also camera working would be difficult and the necessary modification of the electric circuit of the three image pickup tubes is also difficult. Accordingly this approach is not practical.

Another special effect of inverting the direction of the image (either longitudinally or laterally) has been effected in preparing a monochrome system programming by inverting the beam scan of the image pickup tube by electronic means. However in a present day color camera having three color image pickup tubes, such an approach is difficult to practice because of the problem of registration of the three image pickup tubes.

As a result, heretofore, even discrete rotation of the image has not been realized, which imposes a serious restriction on program 1 preparation.

SUMMARY OF THE INVENTION

It is a general object of the present invention to provide a special effect by providing between a taking lens forming a part of an image pickup system and an image receiving medium such as an image pickup tube, an optical device for reflecting light passing through the taking lens and the image receiving medium, and displacing a part of the optical device to thereby change the incident light beam to the image receiving medium in response to the displacement.

It is a first object of the present invention to rotate the image by providing, between the taking lens forming a part of a color television image pickup system and the image pickup tubes including a three-color split prism, an optical device for reflecting light beam passing through the taking lens and the image pickup tubes an even number of times in a looped path, and rotating a part of the optical device.

It is a second object of the present invention to invert the lateral direction of the image continuously or discontinuously by providing, between the taking lens forming a part of the color television image pickup system and the image pickup tubes having the three-color split prism, an optical device for reflecting light beam passing through the taking lens and the image pickup tubes, this optical device including an optical reflection member which comprises the combination of a first reflection member providing odd numbered times of reflection and a second reflection member providing even numbered times of reflection, the reflection members being movable in longitudinal direction with respect to a subject which constitutes the image to be picked up by a conventional television camera, and changing the number of reflection times in the optical device.

It is a third object of the present invention to invert longitudinal direction of the image continuously or discontinuously by providing, between the taking lens forming a part of the color television image pickup system and the image pickup tubes having the three-color split prism, and optical device for reflecting a light beam passing through the taking lens and the image pickup tubes, this optical device including an optical reflection member which comprises the combination of a first reflection member providing odd numbered times of reflection and a second reflection member providing even numbered times of reflection, the reflection members being movable in lateral direction with respect to a subject which constitutes the image to be picked up by a conventional television camera, and changing the number of reflection times in the optical device.

It is a fourth object of the present invention to rotate the image while inverting the direction of the image be suitably combining the above means to invert the direction of the image with the above means to rotate the image.

It is a fifth object of the present invention to provide more complex and more interesting effect image by combining the above means to invert the direction of the image or above means to rotate the image or the combination thereof with other effect generation means such as filter or effect glass.

BRIEF DESCRIPTION OF THE DRAWINGS

In the drawings;

FIGS. 11 through 17 respectively show the embodiments adapted to accomplish the second object of the present invention, in which FIGS. 11 and 13 show the arrangement of the embodiment for continuously inverting the lateral direction of the image, FIG. 12 shows an arrangement of a reflection prism, FIGS. 14 and 15 illustrate the operation, FIG. 16 illustrates the application to mirror shot photographing and FIG. 17 illustrates a special effect in which the lateral direction of the image is continuously inverted.

FIGS. 22 through 27 shows the embodiments adapted to accomplish the third object of the present invention, in which FIGS. 22 and 23 show the arrangement for continuously inverting the longitudinal direction of the image, FIGS. 24 and 25 illustrate the operation, FIG. 26 illustrate the mirror shot photographing and FIG. 27 illustrate the special effect in which the longitudinal direction of the image is continuously inverted.

DESCRIPTION OF THE PREFERRED EMBODIMENTS

Figure 4:
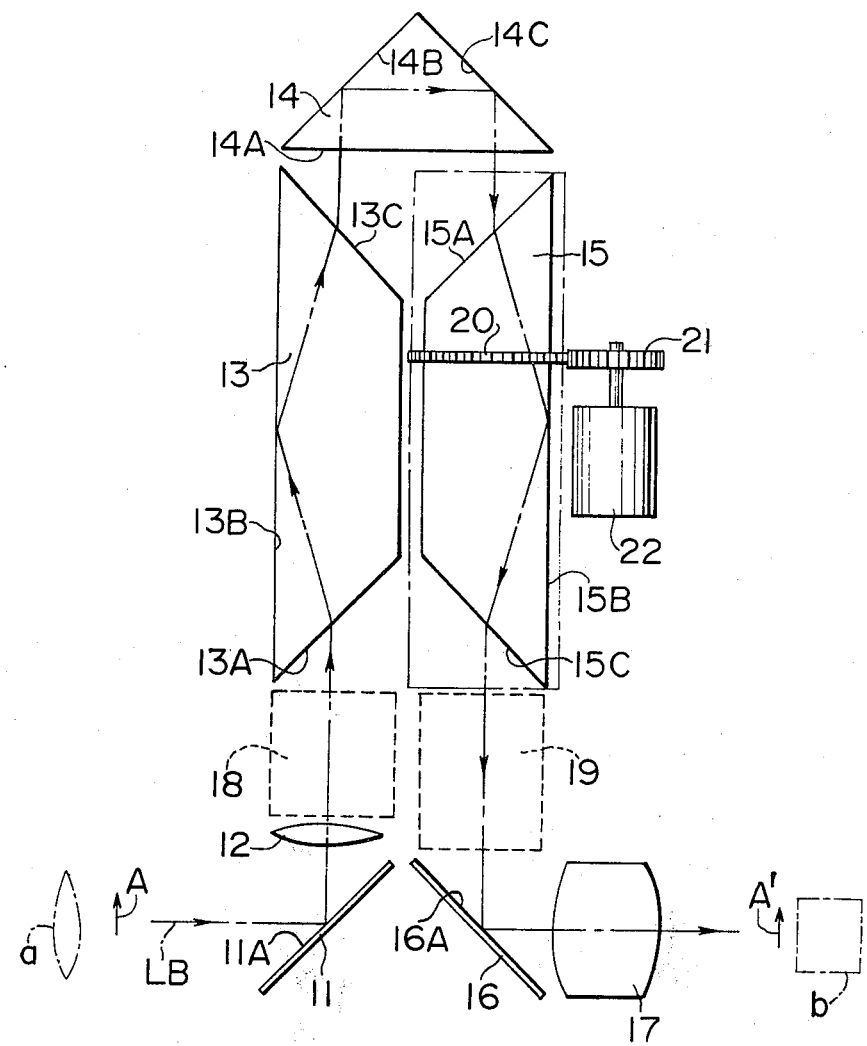
FIGS. 4 and 5 respectively show the embodiments adapted to accomplish the first object of the present invention.
Figure 5:
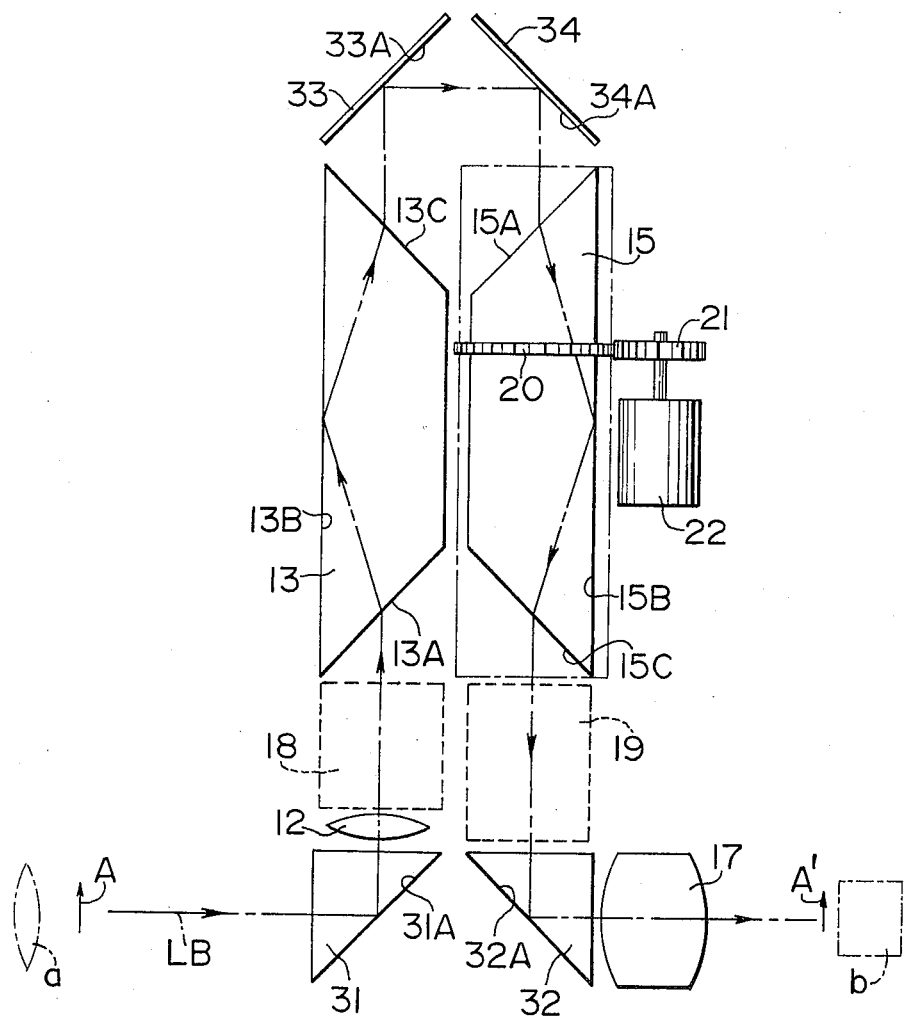

Referring to FIGS. 4 and 5, the first embodiments of the present invention which are adapted to accomplish the first object of the present invention are described in detail. For convenience in illustration they are described as being applied to a television image pickup system.

As seen from FIG. 4, there are provided between a taking lens (zooming lens) $a$ shown by a dot and dash line and a three-color split prism $b$ a first reflection mirror (which may be a prism) 11, a field lens 12, a first inversion prism 13, a prism (which may be a combination of two reflection lenses) 14, a second inversion prism 15, a second reflection mirror (which may be a prism) 16 and a relay lens 17 all arranged in such a manner that they direct the light beam along a looped path, and if desired there are inserted between the first reflection mirror 11 and the first inversion prism 13 and between the second inversion prism 15 and the second reflection mirror 16, respectively, first and second correction lens systems 18 and 19 as shown by broken lines, either one or both of the first and second inversion prisms 13, 15 being rotatable by a well known means such as rotating driving means 22 linked through gear wheels 20 and 21 either continuously or incrementally at a fixed indexing angle.

With this arrangement, the light beam LB passes through the taking lens $a$, and is reflected on a mirror surface of the first reflection mirror 11, focused by the field lens 12, and passes through the first correction lens system 18 which corrects the chromatic aberration and the spherical aberration before directed to an incident surface 13A of the first inversion film 13. The light beam LB impinged on the incident surface 13A is refracted at this surface, totally reflected at the surface 13B and again refracted at the exit surface 13C. The light beam LB, which has been totally reflected once in the inversion prism 13, is then totally reflected twice in the prism 14 and enters the incident surface 15A of the second inversion prism 15 and is refracted at the incident surface 15A, totally reflected at the surface 15B, and again refracted at the exit surface 15C. The light beam LB which has been totally reflected once in the inversion prism 15 leaves the exit surface 153, passes through the second correction lens system 19 and is reflected on the mirror surface 16A of the second reflection mirror 16, passes through the relay lens 17 and reaches the three-color split prism $b$ where it is beam-split and the split beams are focused on the photo-electric surfaces of the respective image pickup tubes.

In this manner an optical image which is an erected image in the input side is reflected by an even numbered times in the special effect device mounted in the loop so that it is taken out in the output side as an erected image $A'$, not as an inverted image. Therefore, no adverse effect arises by inserting the special effect generation device.

FIG. 5 shows a modification of the first embodiment of the present invention and it differs from the arrangement of FIG. 4 in that first and second prisms 31 and 32 are used instead of the first and second reflection mirrors 11, 16, and first and second reflection mirrors 33 and 34 are used instead of the prism 14. The corresponding parts to those of FIG. 4 are identified by the same reference numerals. The path of the light beam is exactly the same as that of FIG. 4 and hence no description thereof is necessary.

Figure 1:
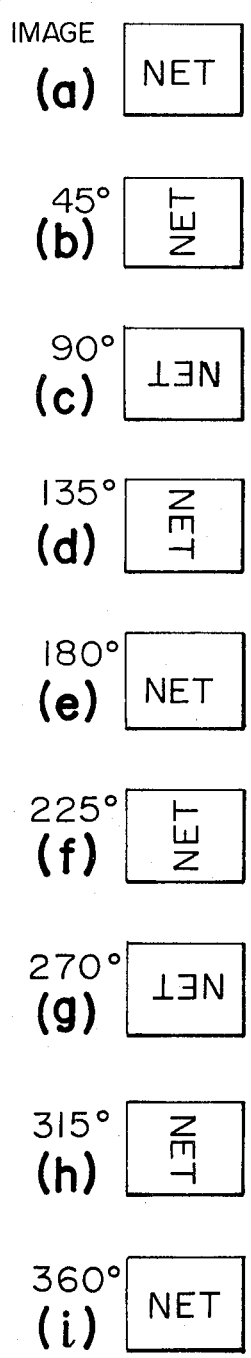
FIG. 1 illustrates an example of a special effect in which the image is sequentially rotated.
Figure 2:
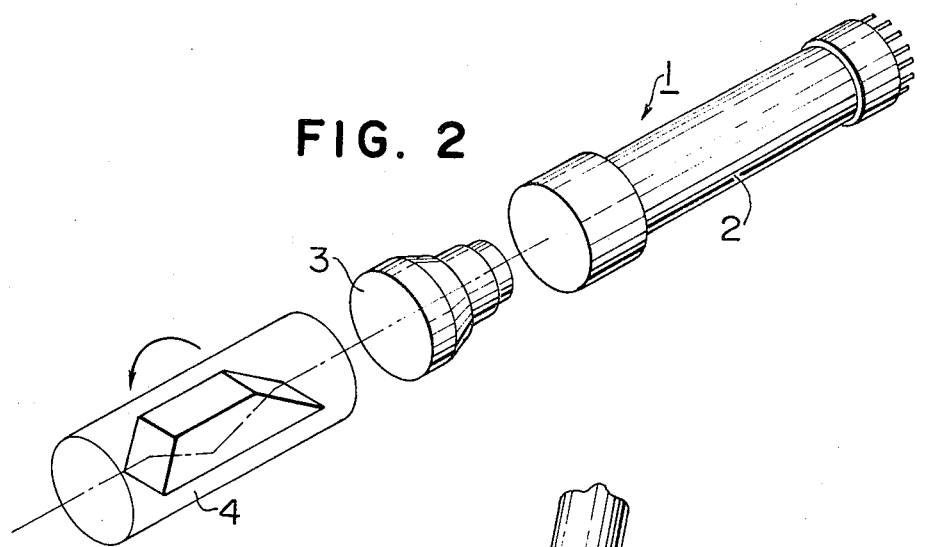
FIG. 2 shows an arrangement of a monochromatic television camera having an inversion prism added thereto.
Figure 3:
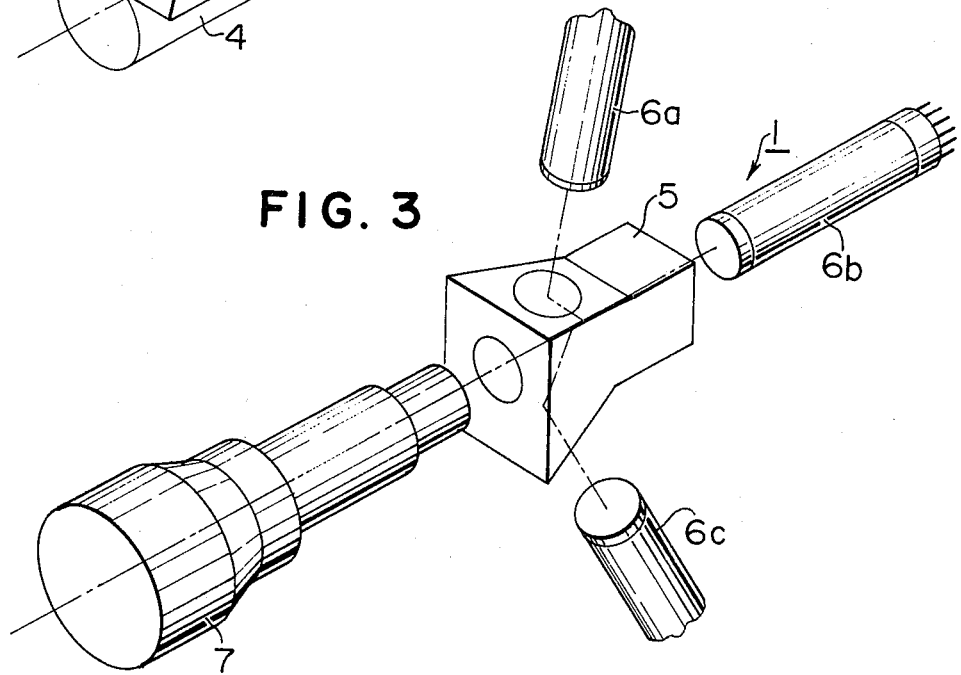
FIG. 3 shows an arrangement of a color television camera.

In the special effect devices as described above, in order to obtain a special effect of rotating the image as shown in FIG. 1, one of the first and second inversion prisms 13 and 15, for example the second inversion prism 15, is rotatably mounted by a bearing, slip ring or the like, not shown, and caused to be rotated either by rotating drive means 22 through gears 20 and 21 or manually. With this arrangement, starting from the original position $(a)$ shown in FIG. 1, the position $(b)$ is produced when the inversion prism 15 is rotated through 45°, the original image is in inverted position when the prism 15 is rotated through 90 degrees, the position is laterally inverted to that of the 45 degrees position when the prism 15 is rotated through 135 degrees, and the image is again erected when the prism 15 is rotated through 180°. From 180° position to 360° position of the prism 15, the above states are repeated. Thus, the image is rotated twice during one revolution of the inversion prism.

By inserting colorless or colored transparent body (such as filter, effect glass or the like) at any suitable position in the optical path of the arrangement, it is possible to add, in addition to the rotation of the image, futher special effect of the image split or the rotation of the crossed highlight image, thereby the fifth object of the present invention can be accomplished.

The rotary prism 15 may be mounted at any position in the optical path such as in front of the relay lens 17 with the same effect being obtained.

As stated above, in the first embodiments of the present invention, there is provided, between the taking lens for the color television camera image pickup system and the image pickup tube or the like, a separate optical system for reflecting the light beam passing through the image pickup system and the image pickup tube an even number of times along a looped path, and the inversion prism forming a part of the optical system is arranged to be rotatable. Thus, it is possible to mount the special effect generation device compatible with a large aperture zooming lens without need for considerably increasing linear distance from the taking lens to the image pickup tube.

Furthermore, with this arrangement, it can be applied to conventional zooming lens and camera device without any modification.

Referring now to FIG. 6 through 10, the second embodiments of the present invention which are adapted to accomplish the first object of the present invention are described.

Figure 6:
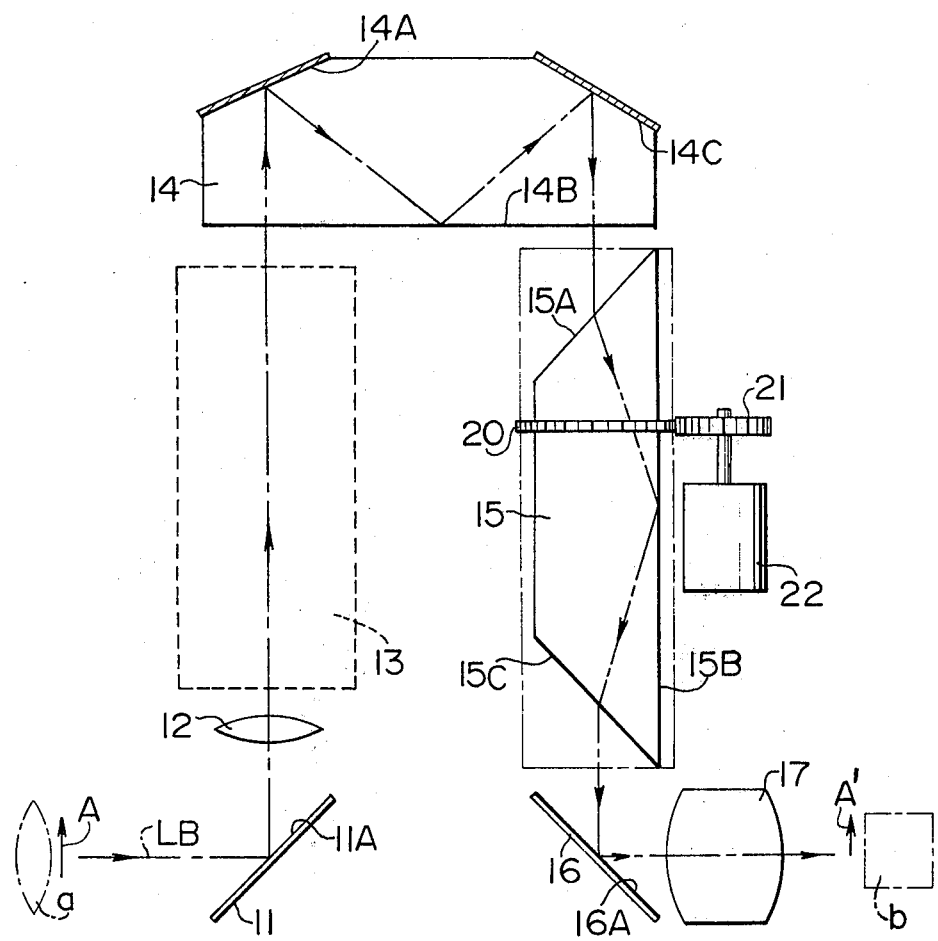
FIGS. 6 through 10 respectively show second embodiments adapted to accomplish the first object of the present invention.

In the embodiment shown in FIG. 6, there are provided, between a taking lens (zoom lens) $a$ and a three-color split prism $b$ shown by dot and dash line, a first reflection mirror (which may be a prism) 11, a field lens 12, a correction lens system 13, a prism (which may be a combination of three reflection mirror) 14, an inversion prism 15, a second reflection mirror (which may be a prism) 16 and a relay lens 17, all arranged in such a manner that they direct light beam emitted from the taking lens $a$ along a looped path, and the inversion prism 15 is adapted to be rotated by a rotary driving means 22 linked by the gear wheels 20 and 21 either continuously or incrementally at a fixed indexing angle.

With this arrangement, the light beam LB is passed through the taking lens $a$, reflected at the mirror surface 11A of the first reflection mirror, focused by the field lens 12, passed through the correction lens system 13 which correct, chromatic aberration and spherical aberration, entered into the prism 14 from its surface 14B to impinge on the mirror surface 14A thereof perpendicularly thereto, reflected at the mirror surface 14A, totally reflected at the surface 14B, further reflected at the mirror surface 14C and goes out of the surface 14B perpendicularly thereto. Thus, the light beam LB is inverted in the inversion prism 14 (reflected three times) and impinges on the incident surface 15A of the inversion prism 15, and it is refracted at the incident surface 15A, totally reflected at the surface 15B and again refracted at the exit surface 15C. The light beam is then mirror-reflected at the second reflection mirror 16, passes through the relay lens 17 to the three-color split prism $b$ where it is a split and the split beams are focused on the photo-electric surfaces of the respective image pickup tubes.

The optical image A which is an erected image in the input side is reflected an even number of times in the special effect adapter device arranged in the optical path so that the image can be taken out in the output side as an erected optical image A' not as an inverted image. Accordingly there occurs no optical problem by inserting the special effect adaptor device.

Figure 7:
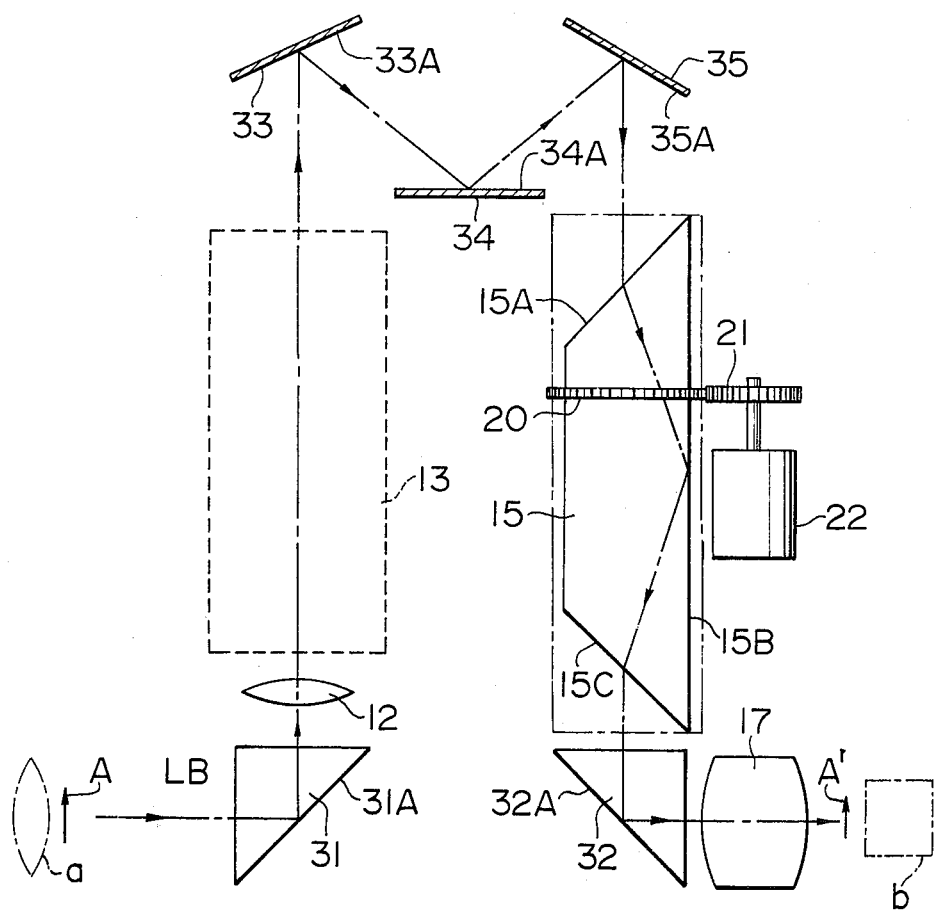

FIG. 7 shows a modification of the second embodiment of the present invention and the arrangement of FIG. 7 differs from that of FIG. 6 in that first and second prisms 31 and 32 are used instead of the first and second reflection mirrors 11 and 16, and first, second and third reflection mirrors 33 to 35 are used instead of the prism 14. The number of times of reflection is the same as that in FIG. 6 and hence there is no difference in their principles.

Figure 8:
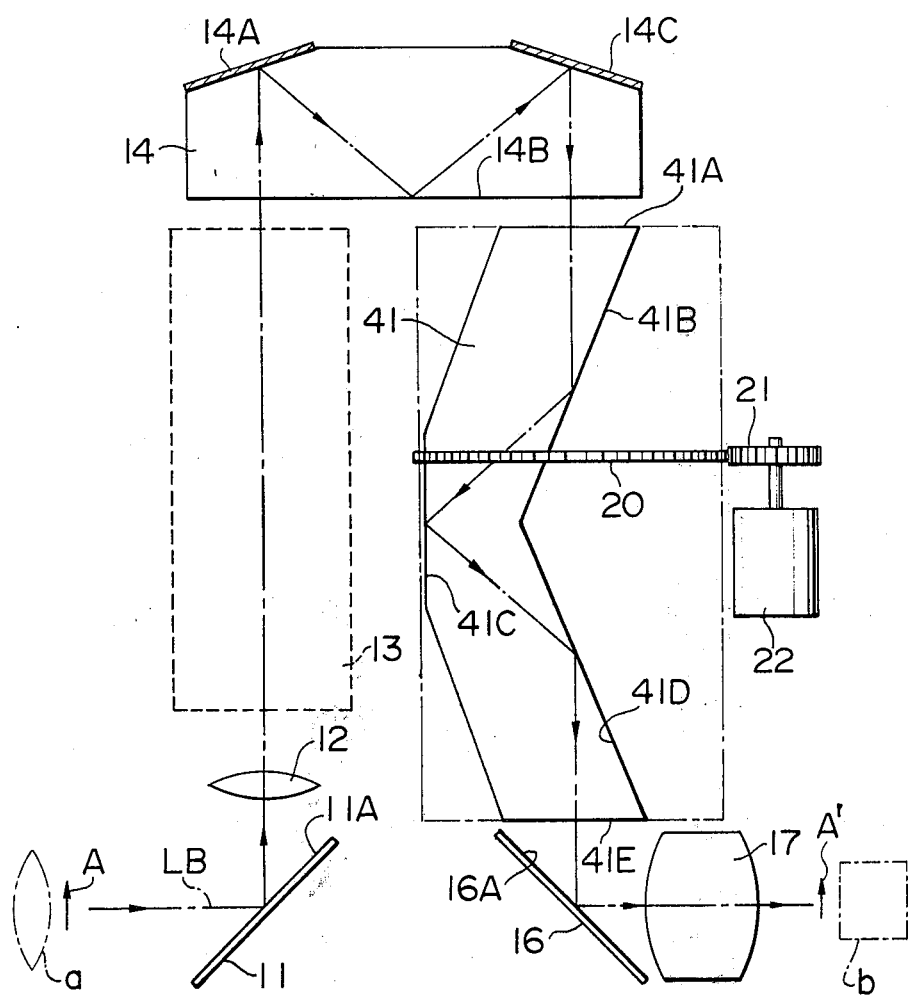

FIG. 8 shows other modification and it differs from the arrangement of FIG. 6 in that a generally V-shaped inversion prism 41 is used in place of the inversion prism 15. Like in the arrangement of FIG. 6, the light beam LB mirror-reflected at the mirror surface 14C of the prism 14 goes out of the surface 14B perpendicularly thereto. The light beam LB inverted in the prism 14 enters the inversion prism 41 from its incident surface 41A perpendicularly thereto and it is then totally reflected at the surface 41B, totally reflected at the surface 41C opposing to the surface 41B and at the surface 41D opposing to the surface 41C, respectively, and goes out of the exit surface 41E perpendicularly thereto. In rotating the inversion prism as stated above, the inversion prism must be rotated about the line passing through the centers of the incident surface 41A and the exit surface 41E.

Figure 9:
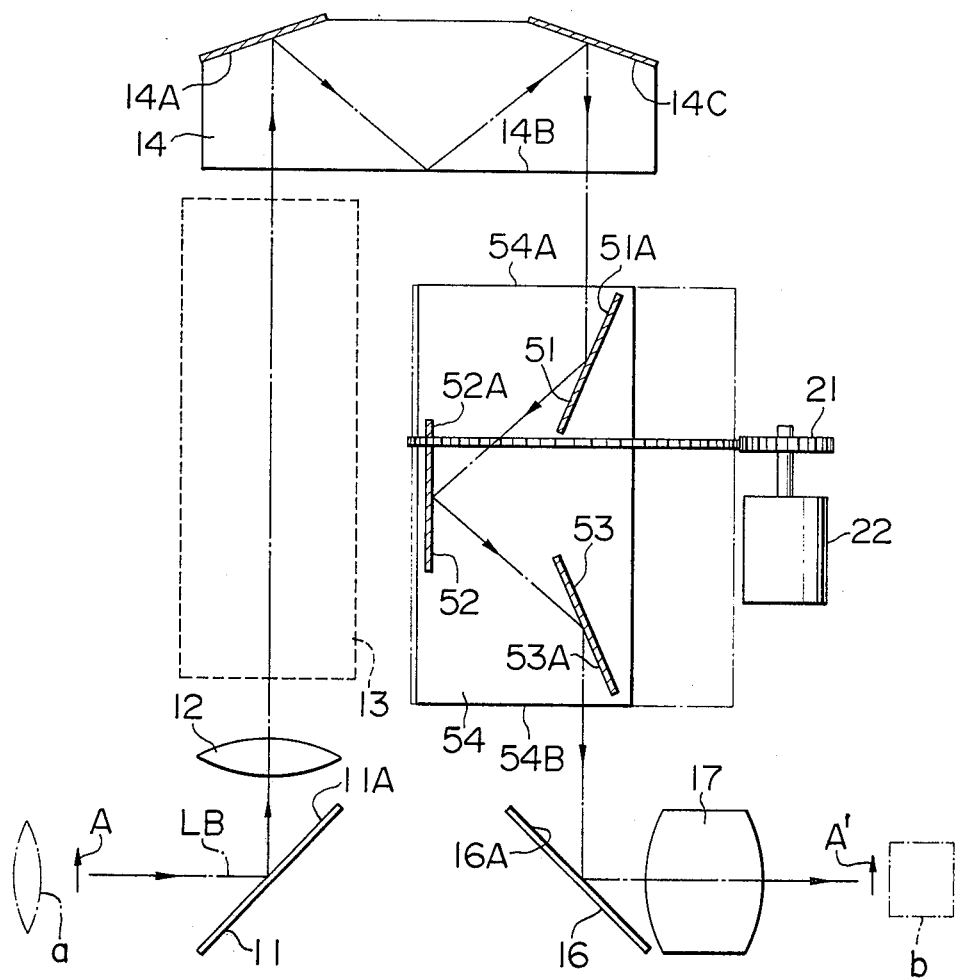

FIG. 9 shows a further modification and it differs from the arrangement of FIG. 6 in that in place of the inversion prism 15 three reflection mirrors 51 to 53 are mounted in a housing 54 to form an inversion mirror 55. The optical path of the light beam passing through the incident surface 54A, the mirror surface 51A, 52A and 53A and the exit surface 54B as well as the relationship of the center axis of rotation are the same as those in the modification shown in FIG. 8.

Figure 10:
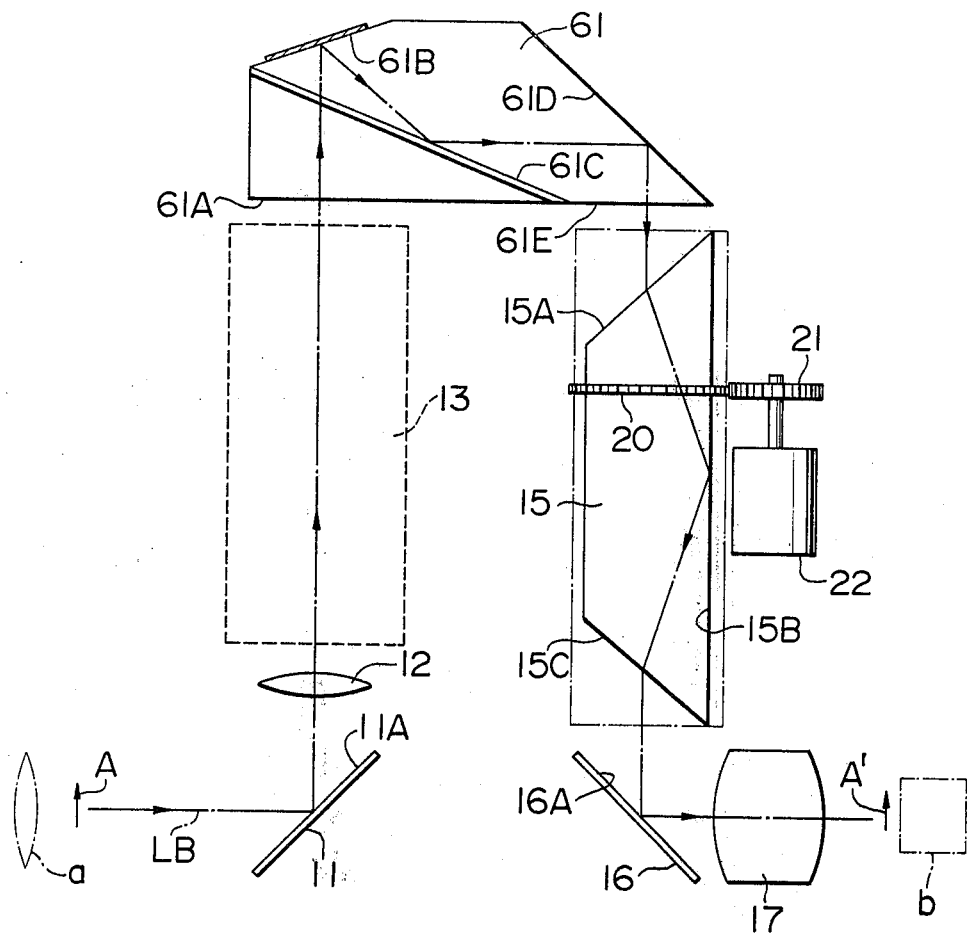

FIG. 10 shows a further modification and it differs from the arrangement of FIG. 6 in that a modified trapezoid-shaped prism 61 consisting of two stacked prisms is used in place of the prism 14. The light beam LB which travels from the correction lens system 13 to the incident surface 61A perpendicularly thereto is mirror-reflected at the surface 61B, totally reflected at the surface 61C, totally reflected at the surface 61D opposing to the surface 61C and goes out of the exit surface 61E perpendicularly thereto.

With such special effect generation devices, in order to accomplish the special effect of rotating the image as shown in FIG. 1, the inversion prisms 15 and 41 and the inversion mirror 55 are rotatably mounted by bearings, slip rings or the like, not shown, so that they can be rotated either by a rotating drive means 22 through the gear wheels 20 and 21 or manually. With this arrangement, starting from the original position ($a$) shown in FIG. 1, the position ($b$) is produced when the inversion prism or the invention mirror is rotated through 45°, the original image is in the inverted position at 90° rotation, the image is laterally inverted with respect to the image at the 45° rotation when the invention prism or the inversion mirror is at 135° rotation, and the image is again in the erected position at the 180° rotation. From 180° position to 360° position, the above procedure is repeated. In this manner the image is rotated twice during one revolution of the inversion prism 15.

By inserting a transparent member (such as filter, effect glass or the like) at any position in the correction lens system 23 or in the optical path of the device, it is possible to add, in addition to the rotation of the image, further special effect such as the split of the image and the rotation of the crossed highlight image. In this manner, the fifth object of the present invention can be accomplished.

As stated above, in the above embodiments of the present invention there is provided, between the taking lens of the color television image pickup system and the image pickup tube, a separate optical system for reflecting the light beam passing through the taking lens and the image pickup tube an even number of times along a looped path, and causing the inversion prism or the inversion mirror which forms a part of said optical system to be rotated. Thus, it is possible to mount the special effect adaptor device compatible with a large aperture zoom lens without necessitating to considerably increase linear distance from the taking lens to the image pickup tube.

Furthermore, with this arrangement, it can be applied to conventional zoom lens and camera device without requiring any modification.

Referring to FIGS. 11 to 21, the preferred embodiments of the present invention adapted to accomplish the second object of the present invention are described.

In the embodiment shown in FIG. 11, there are provided, between a taking lens $a$ and a three-color split prism $b$, a first prism (which may be a reflection mirror) 111, a first field lens 112a, a reflection prism 113 the arrangement of which is to be described later, a correction lens system 114, a second prism (which may be a reflection mirror) 115, a second field lens 112b, and a relay lens 116 all arranged in such a manner that the light beam emitted from the taking lens is directed along a looped path. The split beams from the three-color split prism $b$ are guided to three image pickup tubes 117 (only one of them is shown in the drawing).

Figure 12:
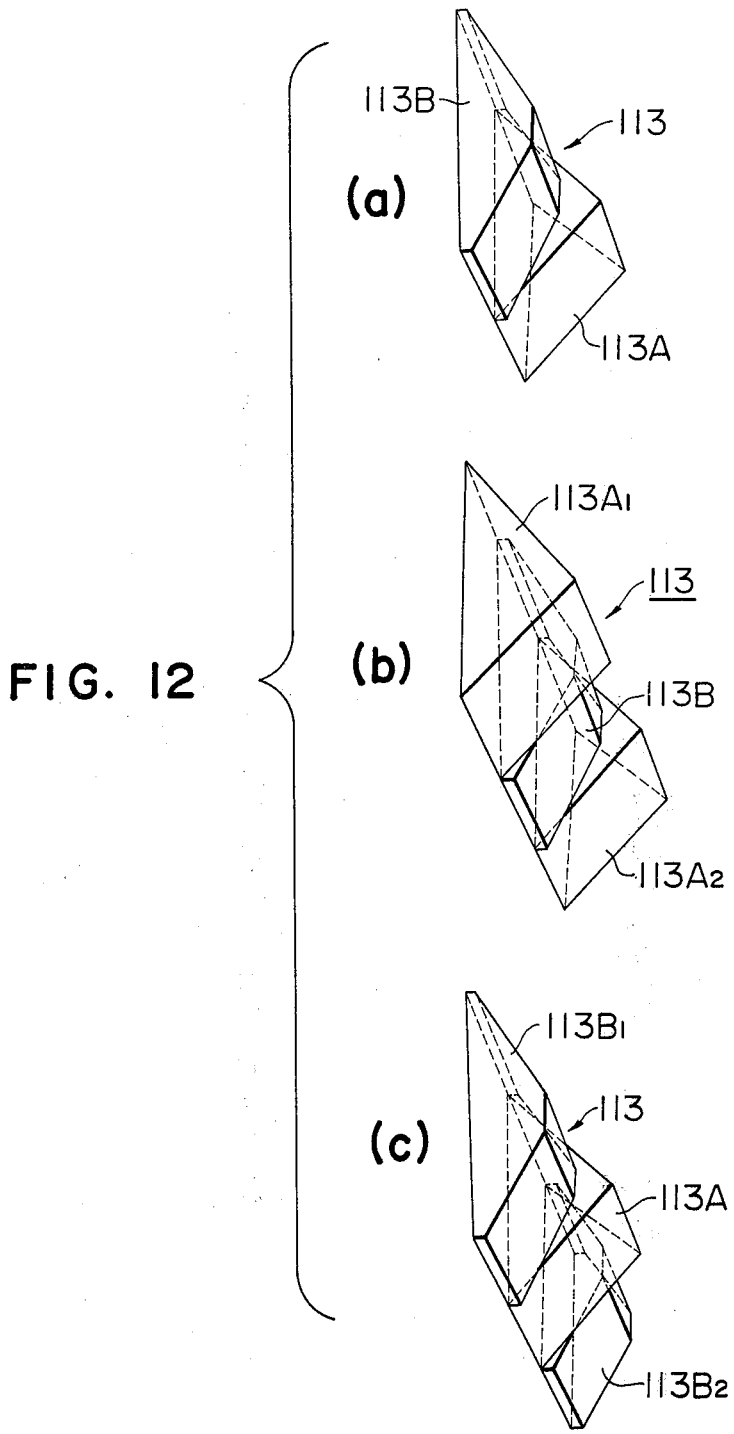

FIG. 12 shows an example of the arrangement of the reflection prism 113 in which FIG. 12(a) shows a combination of a three-reflection prism 113B and a two-reflection prism 113A, FIG. 12(b) shows a combination of the three-reflection prism 113B sandwiched by two-reflection prisms 113A$_1$ and 113A$_2$, and FIG. 12(c) shows a combination of the two-reflection prism 113A sandwiched by three-relection prisms 113B$_1$ and 113B$_2$. In the two-reflection prism 113A, the output optical image is the erected image (the same image) with respect to the input optical image while in the three-reflection prism 113B the output optical image is the inverted image with respect to the input optical image. That is, the output image is laterally inverted.

The image pickup of the object using the reflection prism of the arrangement as shown in FIG. 12(a) as the reflection prism 113 is now described.

Figure 11:
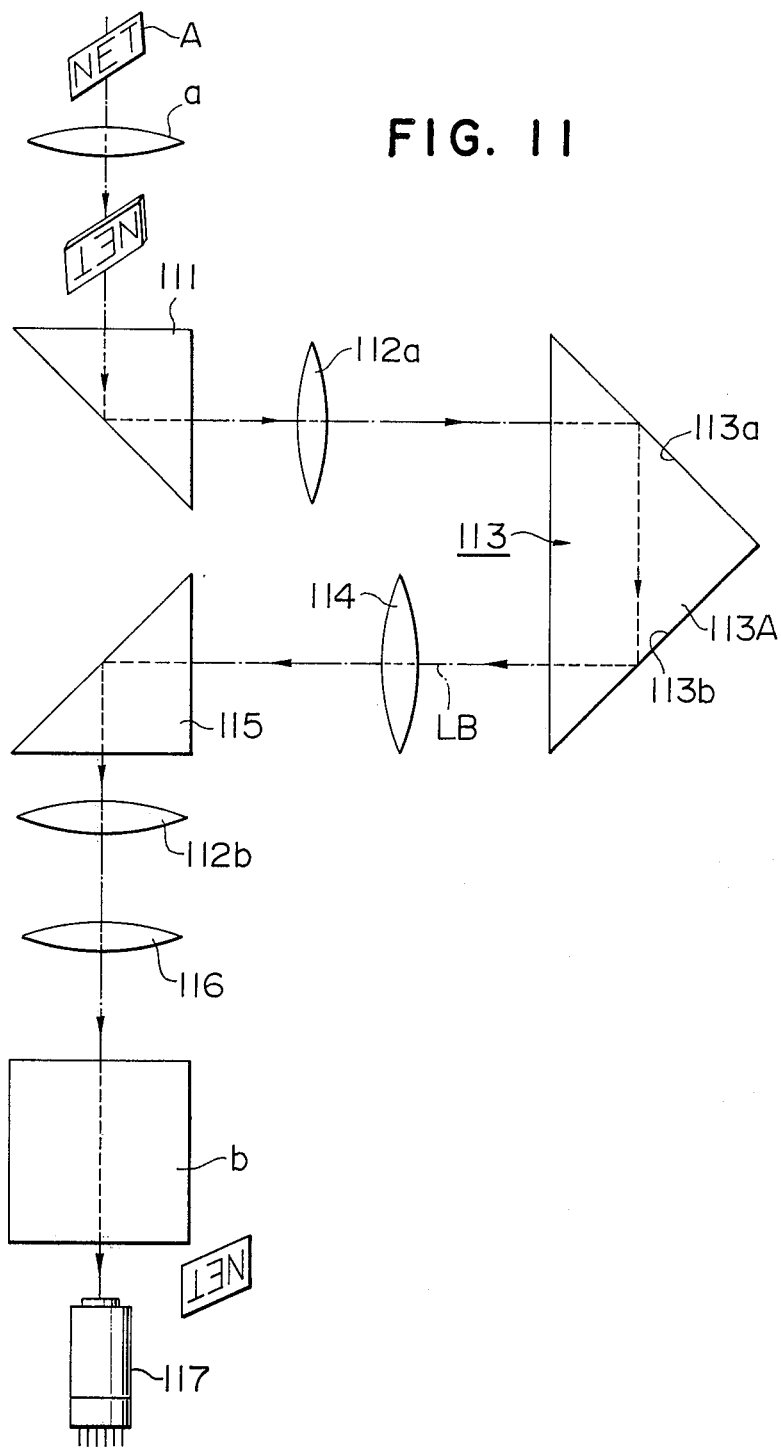

In FIG. 11, when the reflection prism 113 is interposed in such a manner that the two-reflection prism 113A relays the light beam LB into the optical path shown by a broken line, the light beam from the object A passes through the taking lens $a$ and it is reflected at the first prism 111, focused by the field lens 112 and then enters the reflection surface 113a of the reflection prism 113A. The light beam impinged on the reflection surface 113a is totally reflected at this surface and changed its direction of travel, totally reflected at the reflection surface 113b and further changed its direction of travel and goes out of it. Since the reflection prism 113A is the two-reflection prism, the object image entered to the prism 113A is taken out of it in the same relation.

The light beam emitted from the reflection prism 113A is corrected with respect to chromatic aberration and spherical aberration in the correction lens system 114, reflected at the second prism 115, focused by the second field lens 112b, passed through the relay lens 116 to the three-color split prism $b$, where it is beam-split and the split beams are focused on the photo-elective surface of the respective image pickup tubes 117. Since the number of times of the reflection that the light beam is subjected to in the entire system (the optical system from the prism 111 to the relay lens 116) is even number, the output image is same as the input image.

When the reflection prism 113 is moved perpendicularly to a plane including an optical axis looped by the prism 111, reflection prism 113 and the prism 115, that is, in a longitudinal (upward or downward) direction with respect to the object which forms an image plane to be picked up by a conventional broadcasting television camera, and the two-reflection prism 113A is replaced by the three-reflection prism 113B, the number of times of the reflection of the light beam in this system is changed from even number to odd number and the output image is laterally inverted with respect to the input image. The arrangement for carrying out the above function is shown in FIG. 13, in which the direction of the inversion of the image during the movement of the reflection prism 13 is longitudinal with respect to an image plane of a television receiver set.

Figure 13:
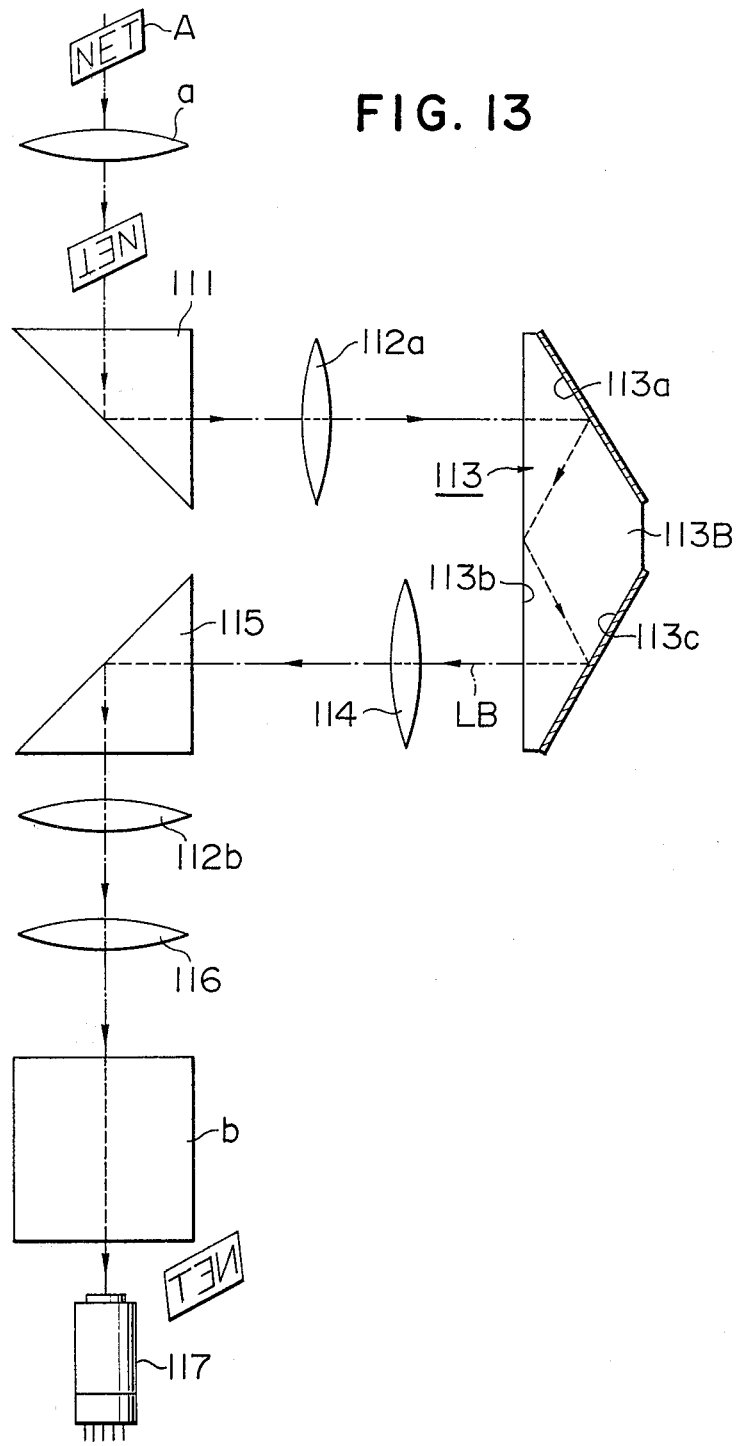

In this case, as shown in FIG. 13, the light beam from the object A is passed through the taking lens $a$, reflected at the reflection surface of the first prism 111, focused by the first field lens 112a and enters the mirror surface 113a of the reflection prism 113B. The light beam LB impinged on the mirror surface 113a is reflected at this surface, reaches the reflection surface 113b, is reflected at this surface and reflected at the mirror surface 113c and goes out of it. Since the three-reflection prism is used, the output image from the prism 113B is in the laterally inverted form with respect to the object image entered to the prism.

Figure 14:
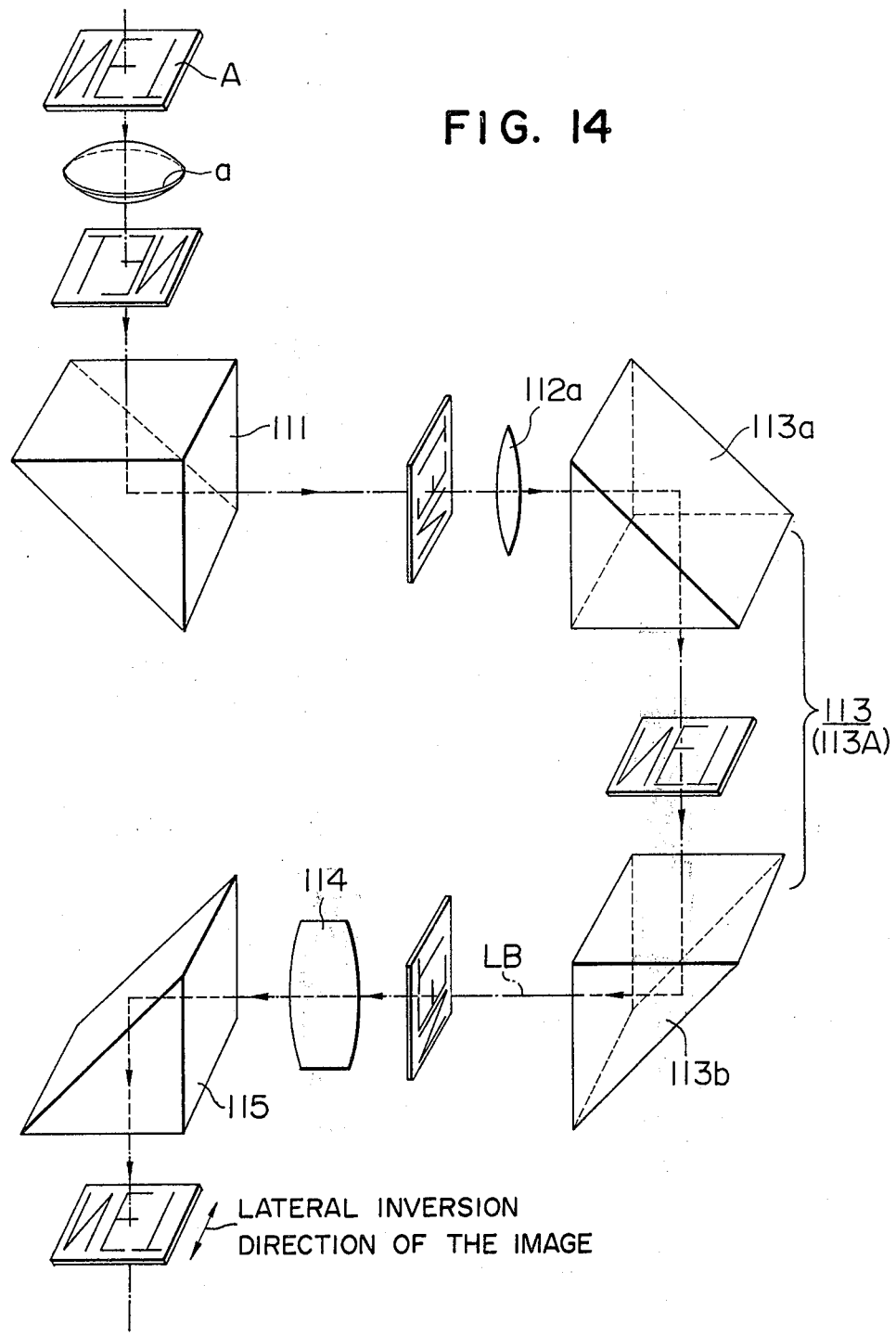
Figure 15:
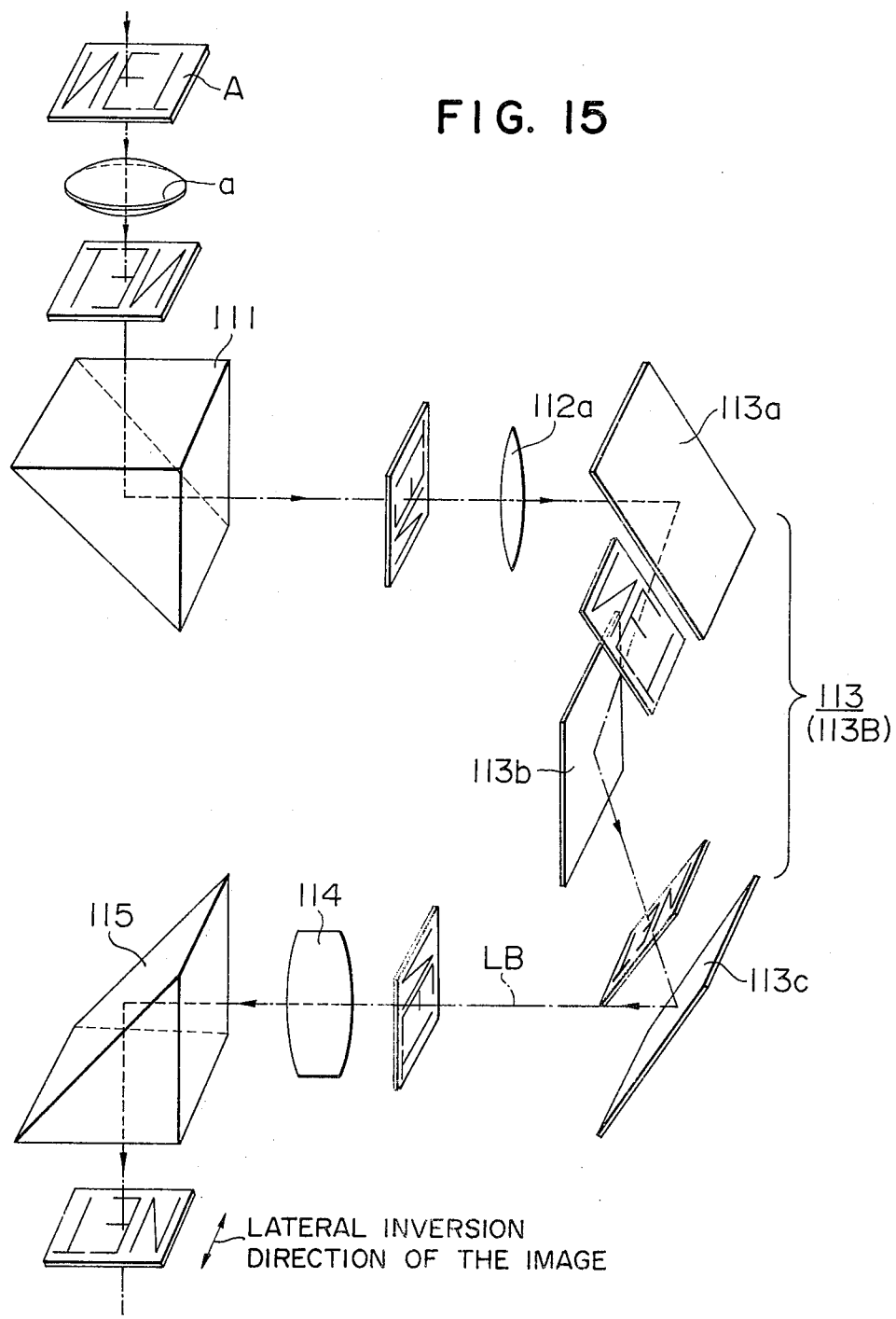

The light beam LB emitted from the reflection prism 113B is corrected with respect to the chromatic aberration and the spherical aberration by the correction lens system 114 (including the relay lens), reflected at the reflection surface of the second prism 115, focused by the second field lens 112b, passed through the relay lens 116 to the three-color split prism $b$ where it is beam-split and the split beams are focused on the photo-electric planes of the respective image pickup tubes 117. FIGS. 14 and 15 illustrate the operation of this system.

FIGS. 17(a) through 17(e) show the change of the image obtained by continuously moving the prism 113 from 113A to 113B. In this case, however, the boundary is not always as distinct as that shown in the drawings.

Figure 16:
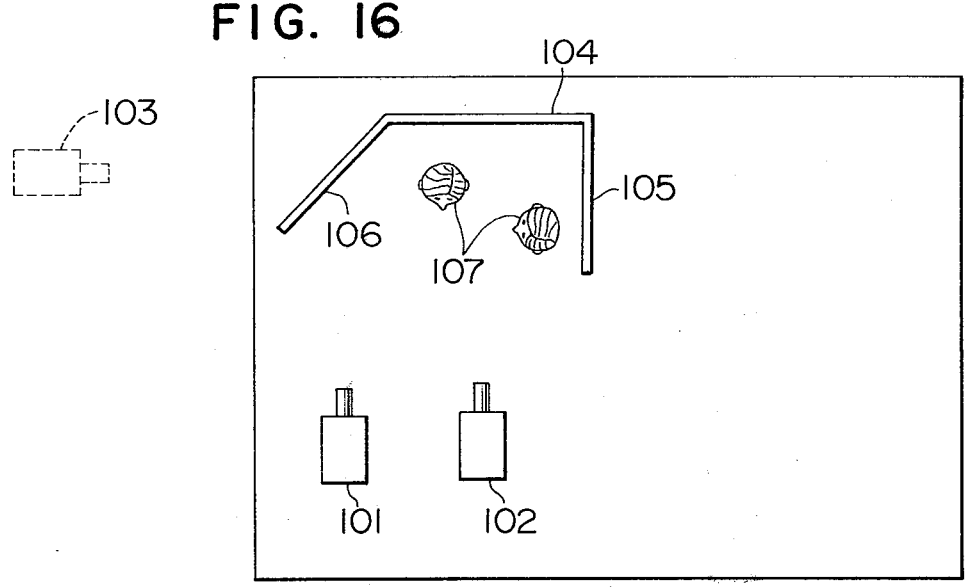
Figure 17:
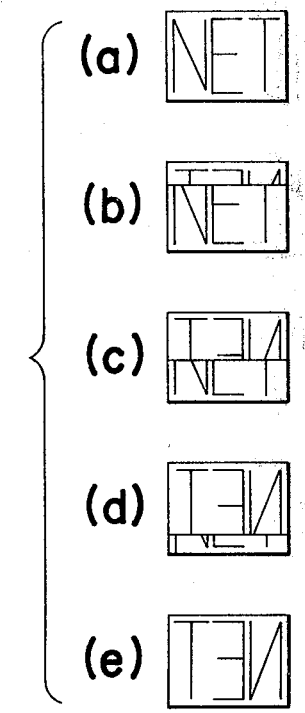

FIG. 16 illustrates a mirror-shot apparatus comprising a camera device 101 having the special effect generation system of the present invention incorporated therein and a conventional camera device 102 together with a set scene 104 such as mountain scene or seaside scene and a mirror 106 behind an object 107. The mirror-shot apparatus is used in such a manner that when it is desired to photograph the set scene from the side but it is not possible to position a conventional camera device 103 shown by a broken line due to the structure of a studio, the scene is photographed through the mirror. In this case, because of the function of the mirror 106, the image photographed would be laterally inverted when the scene is photographed by a conventional camera device. In view of this, the camera device 101 having the special effect generation system of the present invention incorporated therein is used with its reflection prism 113B being arranged, that is, in the state to produce the laterally inverted image, to photograph the set scene via the mirror 106. Since the lateral inversion of the image due to the mirror 106 is again laterally inverted by the camera device 101, the set scene in the form of erected image is produced. Therefore, even if this image is switched to the image obtained by the conventional camera device 102, by the positional relationship of the scene constituted by the object 107 and the set scenes 104, 105 is kept normal and no unnatural aspect is observed.

Figure 18:
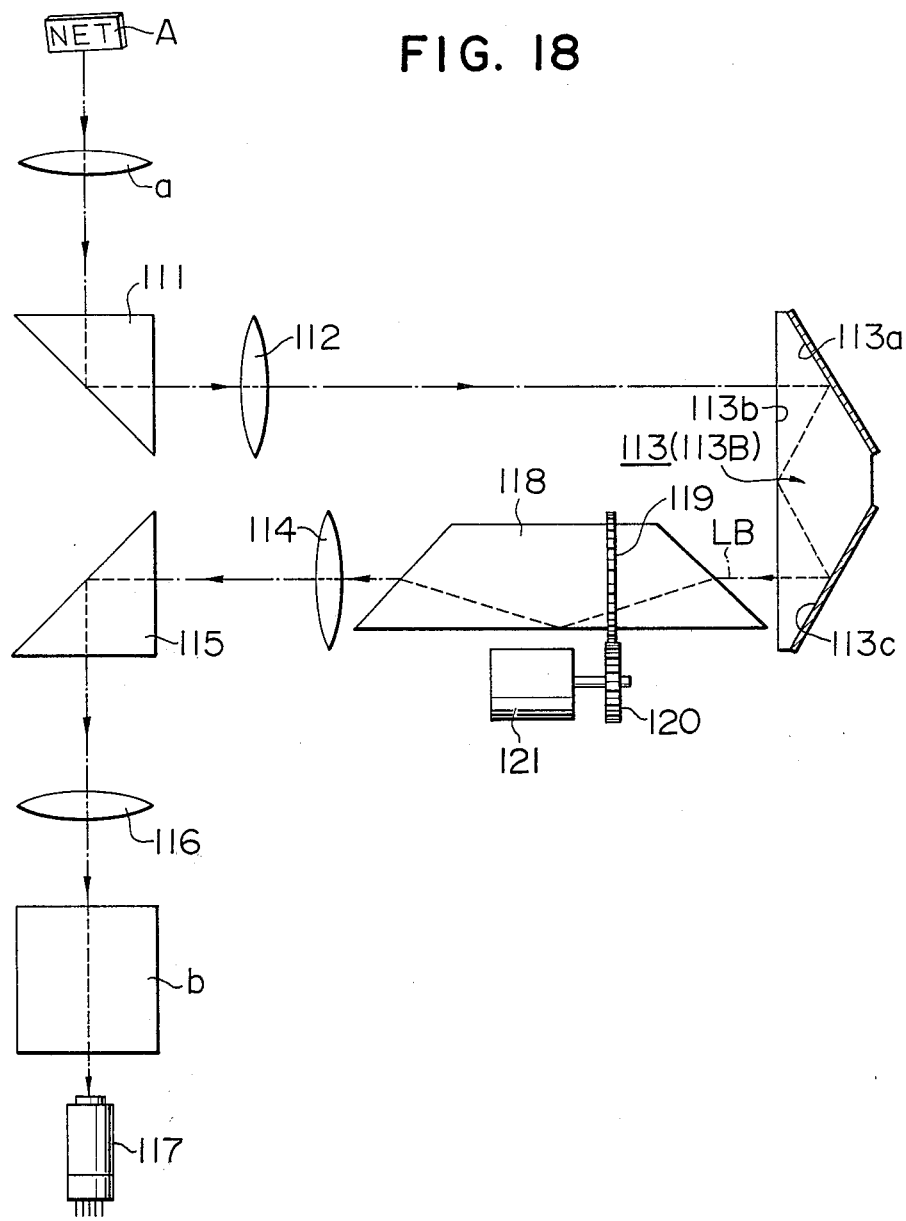
FIGS. 18 and 19 respectively shows the embodiments adapted to accomplish the fourth object of the present invention.
Figure 19:
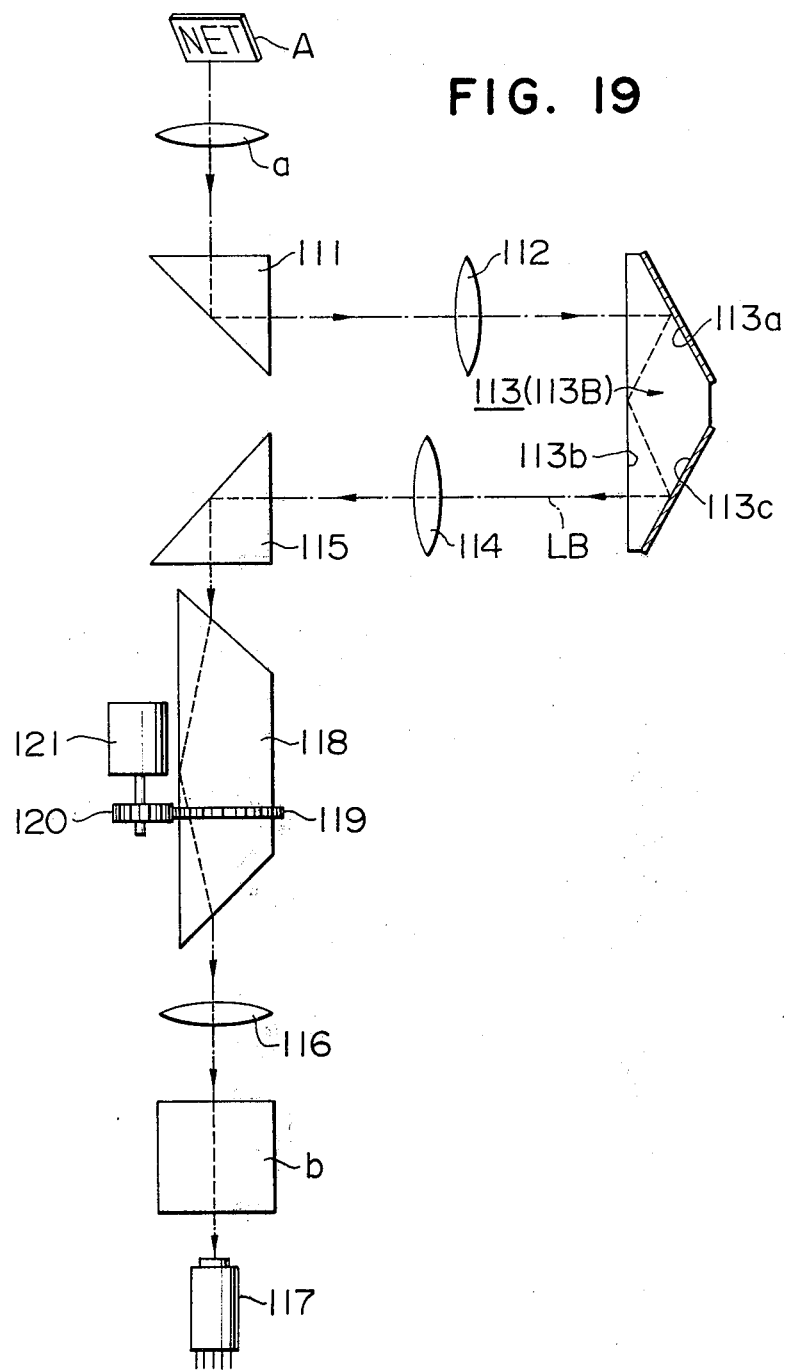
Figure 21:
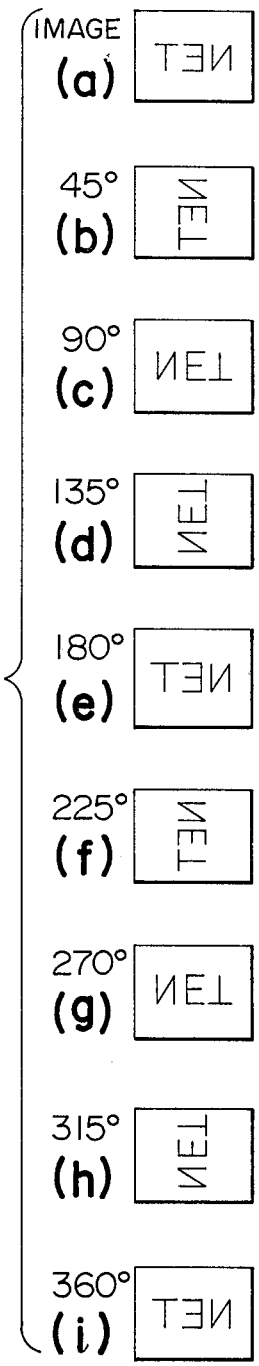
FIGS. 20 and 21 respectively illustrate the examples of the special effect in which the image is continuously rotated and inverted.
Figure 20:
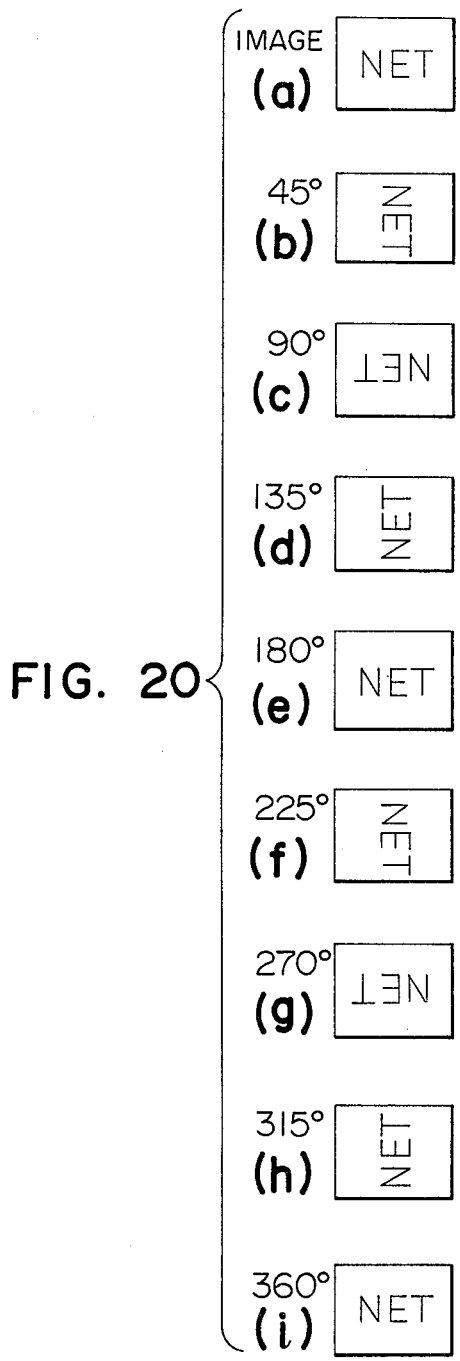

FIGS. 18 and 19 show the embodiments adapted to accomplish the fourth object of the present invention, in which there is inserted an inversion prism 113 at a section where the optical path is looped, for example between a three-reflection prism 113B and a correction lens 114, or at a section other than said looped section, for example between a second prism 115 and a relay lens 116, said prism 113 being rotatably mounted by a bearing, slip ring or the like, not shown, and being caused to be rotated either by a rotating drive means 121 through gear wheels 119 and 120 or manually.

Thus, in the arrangement shown in FIG. 18, when the inversion prism 118 is rotated, the object A is rotated about the optical axis (light beam) either in clockwise direction or in counterclockwise direction resulting in the change of image as shown in FIGS. 20(a) through (i). That is, together with the effect by the change of the number of times of reflection of the reflection prism 113, a further special effect is obtained. When the two-reflection prism 113A is used in place of the three-reflection prism 113B, the rotating inverted images as shown in FIGS. 21(a) through (i) are produced.

As stated above, in the above embodiments, there is provided, between the taking lens forming a part of the color television image pickup system and the image pickup tube including the three-color split prism, an optical device for reflecting the light beam passing through the taking lens and the image pickup tube, and the optical reflection means which forms a part of said optical device comprises a combination of at least one of even-numbered reflection member and at least one of odd-numbered reflection member, said reflection members being adapted to be movable up and down in a longitudinal direction with respect to the object which constitutes the image plane to be picked up by a conventional television camera. Thus, by changing the number of times of the reflection in said optical device, it is possible to continuously invert the lateral direction of the image. In this manner, it is possible to mount the adaptor device for the special effect generation system which is compatible with a large aperture zoom lens without necessitating to considerably increase linear distance from the taking lens to the image pickup tube.

In the present days color television camera device, because of the common use of a large aperture zoom lens, it is almost impossible to mount the inversion prism in front of the taking lens, and it is also almost impossible to employ electronic inversion system of the beam scan in view of the registration problem of the three image pickup tubes. In the past, therefore, even non-continuous switching of the normal and inverted images has not been accomplished. According to the embodiments adapted to accomplish the second object of the present invention, however, it is possible to continuously invert the lateral direction of the image.

Referring to FIGS. 22 to 31, the embodiments of the present invention which are adapted to accomplish the third object of the present invention are described.

In the embodiment shown in FIG. 22, there are provided, between the taking lens $a$ and the three-color split prism $b$ a first prism (which may be a reflection mirror) 111, a first field lens 112a, a reflection prism 113 of the arrangement to be described later, a correction lens system 114, a second prism (which may be a reflection mirror) 115, a second field lens 112b and a relay lens 116 all arranged in such a manner that they direct the light beam from the taking lens $a$ along a looped path, and the split beams from the three-color split prism $b$ are guide to three image pickup tubes 117 (only one of which is shown in the drawing).

The reflection prism 113 may be constituted by a combination of a three-reflection prism 113B and a two-reflection prism 113A as shown in FIG. 12(a), a combination of the three reflection prism 113B sandwiched by two-reflection prisms $113A_1$ and $113A_2$ as shown in FIG. 12(b), or a combination of the two-reflection prism 113A sandwiched by three-reflection prisms $113B_1$ and $113B_2$. In the two-reflection prism 113A, the output image is in the form of erected image (the same image) with respect to the input image while in the three-reflection prism 113B the output image is in inverted form with respect to the input image, that is, it is longitudinally inverted.

The image pickup of the object when the reflection prism arranged as shown in FIG. 12(a) is used as the reflection prism 113 is now described.

In FIG. 22, when the reflection prism 13 is interposed in such a manner that the two-reflection prism 113A relays the light beam LB into the optical path shown by a broken line, the light beam from the object A passes through the taking lens $a$ and it is reflected at the reflection surface of the first prism 111, focused by the first field lens 112a and enters the reflection surface 113a of the reflection prism 113A. The light beam LB impinged on the reflection surface 113a is totally reflected at this surface, changed its direction of travel, totally reflected at the surface 113b, further changed its direction of travel and goes out of it. In this manner, since the reflection prism 113A is the two-reflection prism, the object image entered into the prism 113A goes out of it in the same form.

The light beam emitted from the reflection prism 113A is corrected with respect to the chromatic aberration and the spherical aberration in the correction lens system 114, and then reflected at the second prism 115, focused by the second field lens 112b and passed through the relay lens 116 to the three-color split prism $b$ where it is split and the split beams are focused on the photo-electric planes of the respective image pickup tubes 117. Since the number of times of the reflection that the light beam is subjected to in the entire system (an optical system from the prism 111 to the relay lens 116) is even number, the output image is same as the input image.

When the reflection prism 113 is moved perpendicularly to the plane including an optical axis looped by the prism 111, the reflection prism 113 and the prism 115, that is, in a lateral (rightward or leftward) direction with respect to the object which constitute an image plane to be picked up by a conventional broadcasting television camera, and the two-reflection prism 113A is replaced by the three-reflection prism 113B, the number of times of the reflection of the light beam in the entire system of the present system changes from even number to odd number and the output image is longitudinally inverted with respect to the input image. The arrangement to accomplish this procedure is shown in FIG. 23, in which the direction of the inversion of the image during the movement of the reflection prism 113 is lateral.

Figure 27:
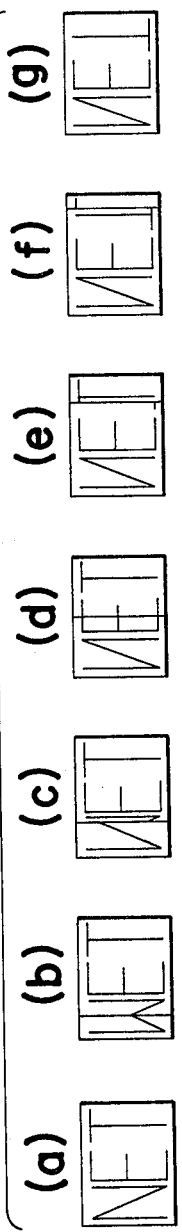

In this case, as shown in FIG. 23, the light beam from the object A passes through the taking lens $a$ and it is reflected at the reflection surface of the first prism 111, focused by the first field lens 112$a$ and directed to the mirror surface 113$a$ of the reflection prism 113B. The light beam LB impinged on the mirror surface 113$a$ is reflected at this surface, passed to the reflection surface 113$b$, reflected at this surface and further reflected at the mirror surface 113$c$ and goes out of it. Since the three-reflection prism is used, the output image from the prism 113B is longitudinally inverted with respect to the input object image. The light beam LB emitted from the reflection prism 113B is corrected with respect to the chromatic aberration and the spherical aberration in the correction lens system 114 (including the relay lens), reflected at the reflection surface of the second prism 115, focused by the second field lens 112$b$ and passed through the relay lens 116 to the three-color split prism $b$ where it is split and the split beams are focused on the photo-electric planes of the respective image pickup tubes 117. FIGS. 24 and 25 illustrate the operation of this system. FIGS. 27($a$) through ($g$) show the change of the image produced when the prism 113 is continuously moved from 113A to 113B. In this case, however, the boundary line is not always as distinct as that shown in the drawing.

Figure 26:
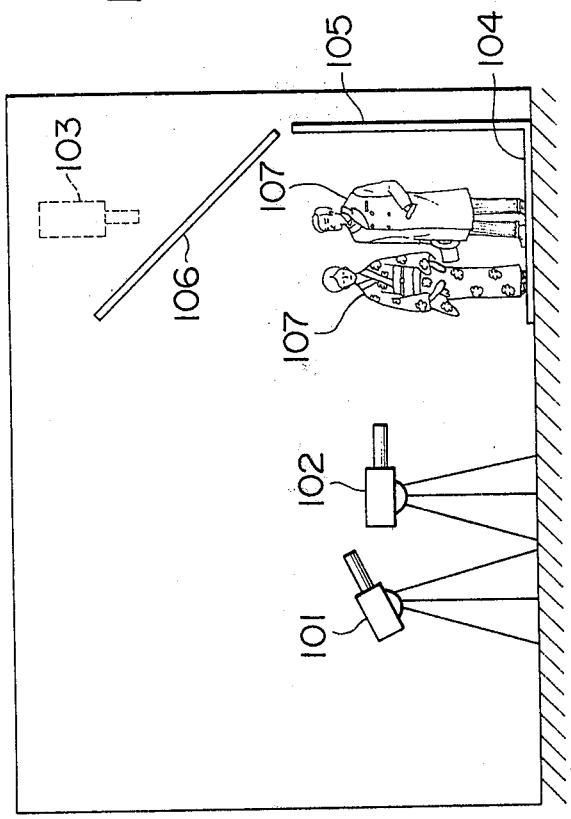

FIG. 26 illustrates a mirror-shot apparatus comprising a camera device 101 having the special effect generation system of the present invention incorporated therein and a conventional camera device 102 together with a set scene 104 such as mountain scene or seaside scene and a mirror 106 behind an object 107. The mirror shot apparatus is used in such a manner that when it is desired to photograph the set scene from the right but it is not possible to position a conventional camera device 103 shown by a broken line due to the structure of a studio, the scene is photographed through the mirror. In this case, because of the function of the mirror 106, the image photographed would be longitudinally inverted when the scene is photographed by a conventional camera device. In view of this, the camera device 101 having the special effect generation system of the present invention incorporated therein is used with its reflection prism 113B being arranged, that is, in the state to produce the longitudinally inverted image, to photograph the set scene via the mirror 106. Since the longitudinal inversion of the image due to the mirror 106 is again longitudinally inverted by the camera device 101, the set scene in the form of erected image is produced. Therefore, even if this image is switched to the image obtained by the conventional camera device 102, the positional relationship of the scene constituted by the object 107 and the set scene 104, 105 is kept normal and no unnatural aspect is observed.

Figure 28:
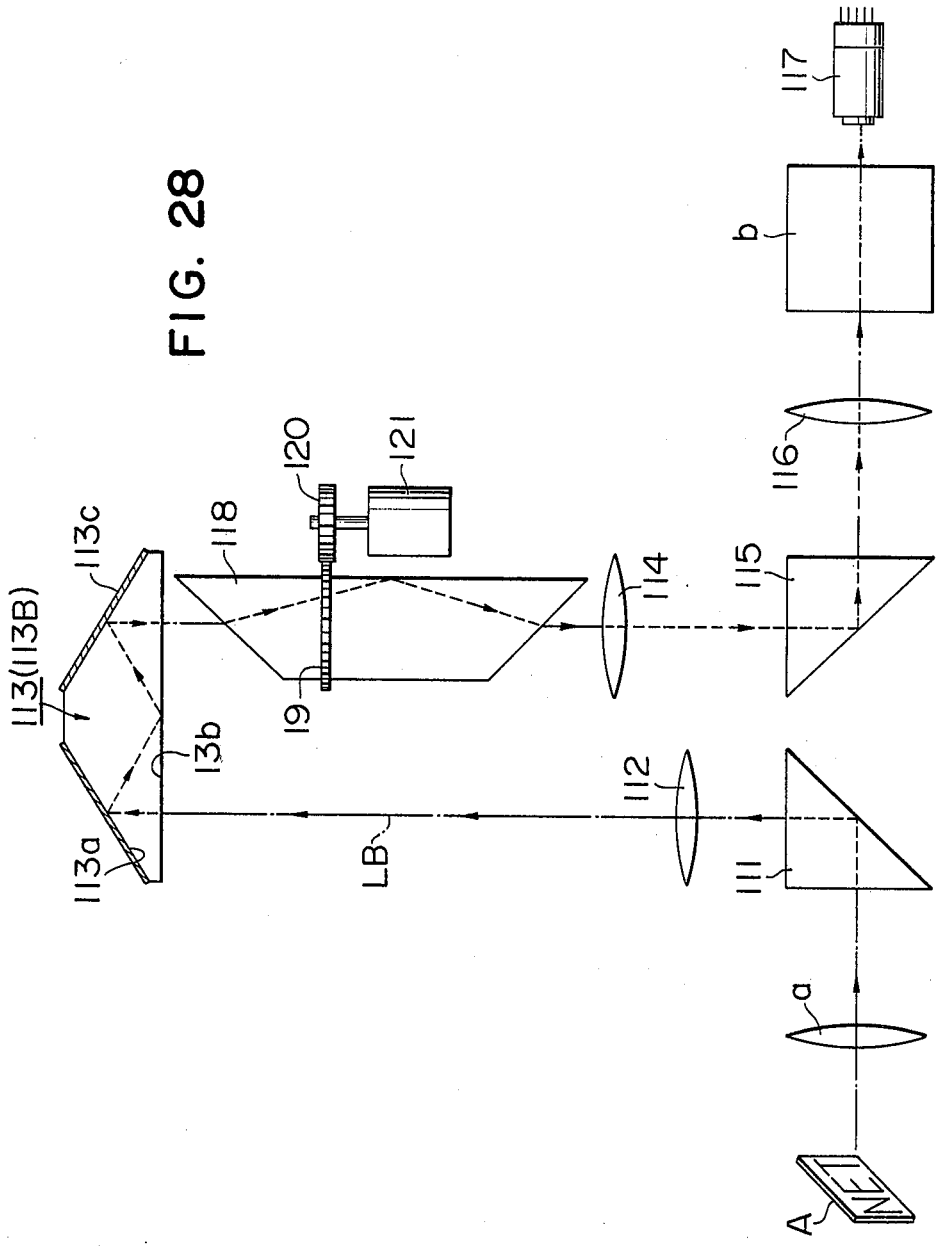
FIGS. 28 and 29 respectively show other embodiments adapted to accomplish the fourth object of the present invention.
Figure 29:
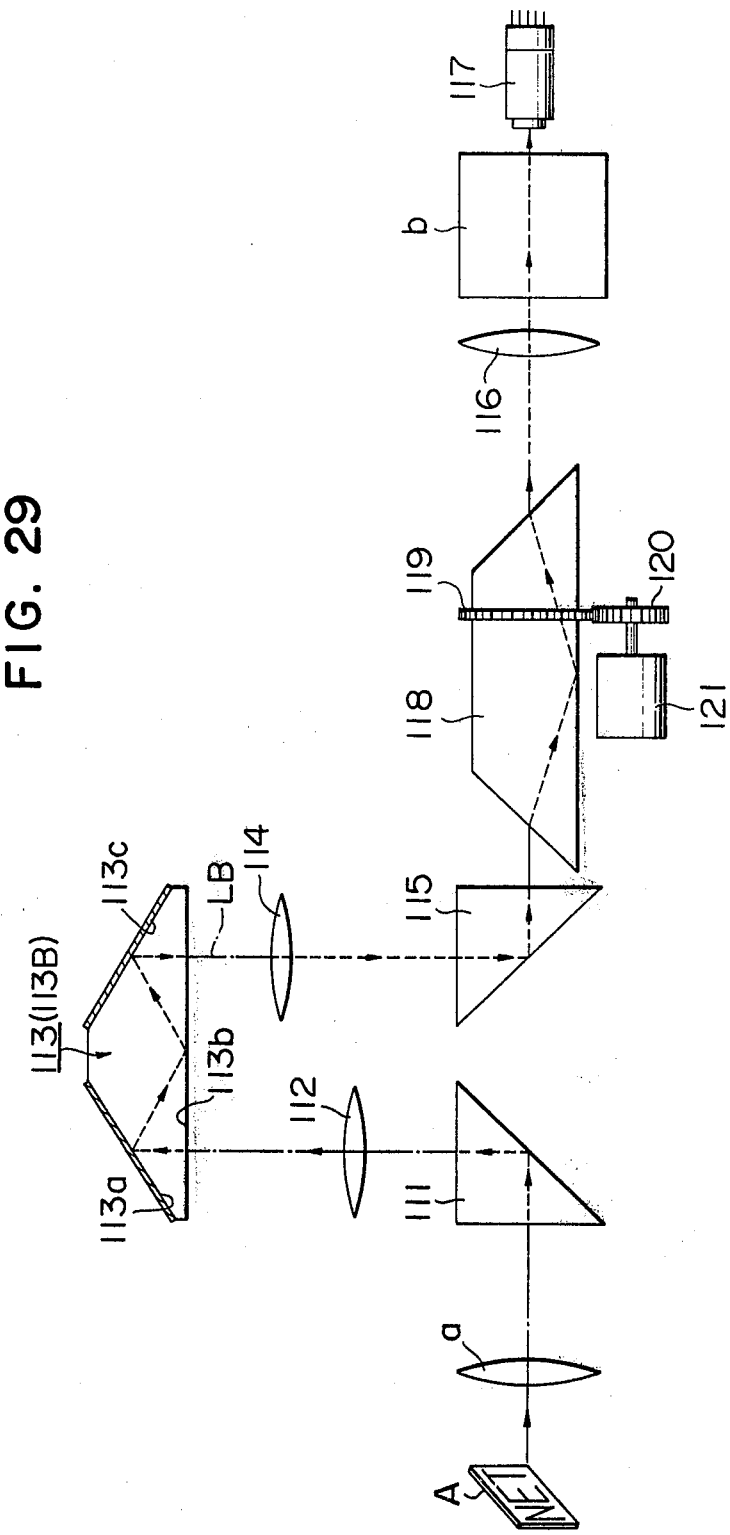

FIGS. 28 and 29 show the embodiments adapted to accomplish the fourth object of the present invention, in which there is inserted an inversion prism 118 at a section where the optical path is looped, for example between a three-reflection prism 113B and a correction lens 114, or at a section other than said looped section, for example between a second prism 115 and a relay lens 116, said prism 118 being rotatably mounted by a bearing, slip ring or the like, not shown, and being caused to be rotated either by a rotating drive means 121 through gear wheels 119 and 120 or manually.

Figure 30:
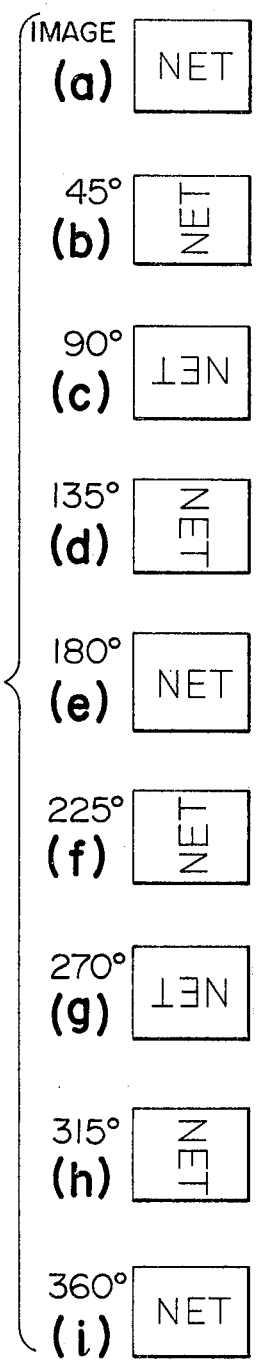

Thus, in the arrangement shown in FIG. 28, when the inversion prism 118 is rotated, the object A is rotated about the optical axis (light beam) either in clockwise direction or in counterclockwise direction resulting in the change of the image as shown in FIGS. 30($a$) through ($i$). That is, together with the effect by the change of the number of times of reflection of the reflection prism 113, a further special effect is obtained.

Figure 31:
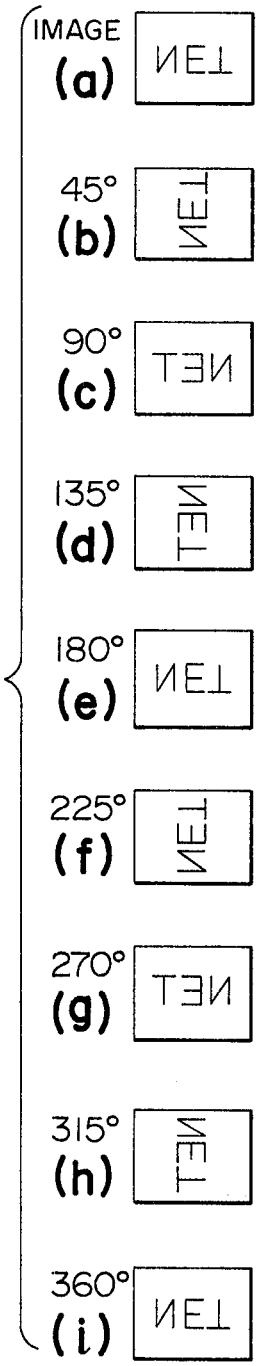
FIGS. 30 and 31 illustrate the special effect in which the image is continuously rotated and inverted.

When the two-reflection prism 113A is used in plane of the three-reflection prism 113B, the rotating inverted images as shown in FIGS. 31($a$) through ($i$) are produced.

As stated above, in the above embodiments, there is provided, between the taking lens forming a part of the color television image pickup system and the image pickup tube including the three-color split prism, an optical device for reflecting the light beam passing through the taking lens and the image pickup tube, and the optical reflection means which forms a part of said optical device comprises a combination of at least one of even-numbered reflection member and at least one of odd-numbered reflection member, said reflection members being adapted to be movable laterally, rightward or leftward, with respect to the object which constitutes the image plane to be picked up by a conventional television camera. Thus, it is possible to change the number of times of the reflection. In this manner, it is possible to mount the adaptor device for the special effect generation system which is compatible with a large aperture zoom lens without necessitating to considerably increased linear distance from the taking lens to the image pickup tube.

In the present days color television camera device, because of the common use of a large aperture zoom lens, it is almost impossible to mount the inversion prism in front of the taking lens, and it is also almost impossible to employ electronic inversion system of the beam scan in view of the registration problems of the three image pickup tubes. In the past, therefore, even non-continuous switching of the normal and inverted images has not been accomplished. According to the embodiments of the present invention, however, it is possible to continuously invert the longitudinal direction of the image.

In the various embodiments and modifications thereof shown and described above, it should be understood that an image receiving member such as cinema film may be used in place of the image pickup tube to carry out special effect photographing. It should also be understood that various embodiments of the present invention may be practiced in an image project device a projector or the like.

What we claim is:

1. A special effect generation arrangement for a color television pickup system, comprising:
    reflection means disposed between a taking lens and a three color split optical device for directing light from said lens to the optical device along a path lying in a plane normal to an axis extending between the lens and the optical device, said reflection means including an even numbered reflecting member integrally disposed with an odd numbered reflecting member; and
    means for moving said reflecting members in a direction normal to said plane to selectively introduce said members into the light path thereby permitting variation between normal and inverted states of images conveyed by said light to the optical device.

2. A special effect generation arrangement as set forth in claim 1, wherein said plane is horizontal.

3. A special effect generation arrangement as set forth in claim 1, further comprising:
an image rotation prism positioned along said light path; and
means for rotating said prism both independently of, and simultaneously with, movement of said reflecting members.

4. A special effect generation arrangement as set forth in claim 3, wherein said plane is horizontal.

* * * * *